(12) United States Patent
Harvell et al.

(10) Patent No.: US 7,715,324 B1
(45) Date of Patent: May 11, 2010

(54) CONDITIONAL PROTOCOL CONTROL

(75) Inventors: Bradley B. Harvell, Chandler, AZ (US); Joseph D. DePalo, Peoria, AZ (US); Michael M. Gordon, Paradise Valley, AZ (US); Jason L. Wolfe, Gilbert, AZ (US)

(73) Assignee: Limelight Networks, Inc., Tempe, AZ (US)

( * ) Notice: Subject to any disclaimer, the term of this patent is extended or adjusted under 35 U.S.C. 154(b) by 0 days.

(21) Appl. No.: 12/625,436

(22) Filed: Nov. 24, 2009

Related U.S. Application Data

(63) Continuation of application No. 12/572,981, filed on Oct. 2, 2009, which is a continuation-in-part of application No. PCT/US2009/038361, filed on Mar. 26, 2009.

(30) Foreign Application Priority Data

Mar. 26, 2009  (AU)  .............................. 2009201833

(51) Int. Cl.
*H04J 1/16* (2006.01)
*H04L 12/56* (2006.01)
(52) U.S. Cl. ........................ 370/252; 370/389; 370/412; 370/466
(58) Field of Classification Search ................. 370/252, 370/412, 389, 466
See application file for complete search history.

(56) References Cited

U.S. PATENT DOCUMENTS

| | | | |
|---|---|---|---|
| 6,029,200 A | 2/2000 | Beckerman et al. | |
| 6,038,603 A | 3/2000 | Joseph | |
| 6,397,246 B1 | 5/2002 | Wolfe | |
| 6,591,304 B1 | 7/2003 | Sitaraman et al. | |
| 7,367,051 B1 | 4/2008 | Siegrist et al. | |
| 7,480,254 B2 | 1/2009 | Mayer | |
| 2003/0074482 A1 | 4/2003 | Christensen et al. | |
| 2005/0097212 A1 | 5/2005 | Engel et al. | |
| 2005/0210121 A1* | 9/2005 | Taylor et al. | ................. 709/218 |

* cited by examiner

*Primary Examiner*—John Pezzlo
(74) *Attorney, Agent, or Firm*—Townsend and Townsend and Crew, LLP

(57) ABSTRACT

In one embodiment, a system for adapting the interoperation of nodes in an information processing system is disclosed. The system includes a protocol handler, a protocol attribute information store and a protocol attribute selector. The protocol handler manages a first connection and a second connection over the network using a protocol. The protocol attribute information store holds a plurality of attributes. The protocol attribute selector evaluates first information related to a first connection, utilizes the protocol attribute information store to determine first protocol attributes corresponding to the first connection, and communicates the first attributes for the first connection to the protocol handler. Additionally, the protocol attribute selector evaluates second information related to a second connection, utilizes the protocol attribute information store to determine second attributes corresponding to the second connection, and communicates the second attributes for the second connection the protocol handler. The protocol handler uses first attributes for the first connection and second attributes for the second connection.

11 Claims, 14 Drawing Sheets

810

| File name | Provider | File Size | Type | ... | Attribs |
|---|---|---|---|---|---|
| logo.gif | ABC | 50k | image | ... | attr1=no |
| Index.html | ABC | 100k | text | ... | attr1=no |
| movie.mpg | ABC | 1GB | video | ... | attr1=yes |

820

| Provider | Service Level | ... | Attribs |
|---|---|---|---|
| ABC | Premium | ... | attr4=100000, attr6=fast |
| DEF | Standard | ... | attr4=300000, attr6=slow |

| IP Address / Prefix | AS # | Country | ... | Attribs |
|---|---|---|---|---|
| 123.012.034.0 /24 | 12345 | US | ... | attr3=25 |
| 234.079.091.0 /24 | 34567 | US | ... | attr3=40 |
| 169.234.056.078 | UNK | ASIA | ... | attr3=35 |

840

| AS # | Location | Service Type | Link utilization | ... | Attribs |
|---|---|---|---|---|---|
| 12345 | Tempe, AZ | DSL | 43% | ... | attr6=fast, attr3=25 |
| 34567 | Chicago, IL | Cable | 92% | ... | attr6=slow |
| 34567 | Atlanta, GA | SAT | -- | ... | attr3=40 |

FIG. 8B

| ServerID | BW | CPS | ... | Attribs |
|---|---|---|---|---|
| E1 | 725 | 900 | ... | attr4=100000, attr6=fast |
| E56 | 937 | 1877 | ... | attr4=300000, attr6=slow |

| Performance Profile | Timing | Pacing | Send Window | Comment |
|---|---|---|---|---|
| P1 | 25 | 1 | 300000 | large file, near user |
| P2 | 40 | 1 | 175000 | large file, latent user |
| P3 | 25 | 0 | 100000 | small file |

CONDITIONAL PROTOCOL CONTROL

CONDITIONAL PROTOCOL CONTROL

This application claims priority to Australian Patent Application Serial No. 2009201833, filed Mar. 26, 2009, which claims priority to International Patent Application Serial No. PCT/US2009/038361, filed Mar. 26, 2009; which are both incorporated herein by reference in their entirety.

This application also claims priority to U.S. patent application Ser. No. 12/572,981, filed Oct. 2, 2009, which is a continuation-in-part of International Patent Application Serial No. PCT/US2009/038361, filed Mar. 26, 2009; which are both incorporated herein by reference in their entirety.

BACKGROUND

This disclosure relates in general to interoperating nodes in an information processing system, such as an Internet content delivery system or an Internet transaction acceleration system, and, but not by way of limitation, to control of connection protocols.

In an information processing system, including communications networks such as the Internet, two or more nodes can work together, for example exchanging information or sharing resources, using one or more protocols that enable the participating nodes to interoperate. Nodes need not be physically distinct from one another, though they may be; normally, however, nodes are at least logically distinct from one another in at least some respect. Interoperating nodes may be operated or managed by a single common authority or by independent, unrelated authorities. Two or more interoperating nodes are often independently operated or managed; the Internet includes many well known examples of the interoperation of two or more independently managed nodes.

A protocol can be standardized such that a node using the standard protocol should be able to interoperate, at least at the level of the protocol, with any other node using the standard protocol. Standard protocols that become widely adopted can permit a node to interoperate with many other nodes. One such widely adopted standard protocol on the Internet is the Transmission Control Protocol (TCP), which today enables almost every device on the Internet to interoperate with almost every other device. TCP operates at the connection layer and enables nodes to interoperate with other nodes by establishing communications connections.

Standard protocols often employ the use of attributes, such as configurable parameters and selectable algorithms, to permit the protocol to operate effectively in various situations. For example, TCP controls message size, the rate at which messages are exchanged, and factors related to network congestion through the use of attributes, including both by the use of parameters, such as the receive window field used in sliding window flow control and the retransmission timer, and by the use of algorithms, such as slow-start, congestion avoidance, fast retransmit, and fast recovery algorithms. It is often the case, in many standard protocols, that at each node the initial protocol attribute settings to be used for all the communication connections at the node can be independently specified by the operator of the node.

A protocol can also be customized, which in general requires that each node have installed customized components to enable the custom protocol. Without the customized components, the node would not be able to fully interoperate with other nodes using the customized protocol. Although it therefore may limit the total number of interoperable nodes, or in the alternative require widespread action to install the protocol customized components, or possibly both, protocol customization is used in order to add function, improve performance, increase flexibility, or modify other characteristics of a standard protocol, or to make available an entirely new customized protocol. Many customized protocols have been proposed for use on the Internet.

SUMMARY

In one embodiment, a system utilizing a standard protocol to enable two or more nodes to interoperate is disclosed. The protocol attributes specified in the standard protocol are conditionally adapted to the circumstances, use, and/or operating conditions of the interoperation of the nodes. In another embodiment a method is disclosed for utilizing a standard protocol to enable two or more nodes to interoperate, wherein the protocol attributes specified in the standard protocol are conditionally adapted to the circumstances, use, and/or operating conditions of the interoperation of the nodes.

In one embodiment, a system for supplying content objects over a network is disclosed. The system includes a protocol handler, a protocol attribute information store, and a protocol attribute selector. The protocol handler manages a first connection and a second connection over the network using a standard protocol. The protocol attribute information store holds a plurality of attributes defined for a plurality of connections. The protocol attribute selector receives first information based on a first request for content, identifies first attributes corresponding to the connection that will service the first request for content, provides the protocol handler with the first attributes for the connection servicing the first request for content, receives second information based on a second request for content, identifies second attributes corresponding to the connection that will service the second request for content, and provides the protocol handler with the second attributes for the connection servicing the second request for content.

In another embodiment, a network connection method for delivering content is disclosed. A first request for content is received over a network at a server. The first request for content is evaluated to select first protocol attributes. A first connection that sends the content from the server to a first node is configured according to the first protocol attributes. A second request for content is received over the network at the server. The second request for content is evaluated to select second protocol attributes. A second connection that sends the content from the server to a second node is configured according to the second protocol attributes, where the first attributes affect the operation of the protocol differently than the second attributes affect the operation of the protocol.

In another embodiment, a system for conducting transactions over a network is disclosed. The system includes a protocol handler, a protocol attribute information store, and a protocol attribute selector. The protocol handler manages a first connection and a second connection over the network using a standard protocol. The protocol attribute information store holds a plurality of attributes defined for a plurality of connections. The protocol attribute selector receives first information based on a first transaction, identifies first attributes corresponding to the connection that will service the first transaction, provides the protocol handler with the first attributes for the connection servicing the first transaction, receives second information based on a second transaction, identifies second attributes corresponding to the connection that will service the second transaction, and provides the protocol handler with the second attributes for the connection servicing the second transaction.

In another embodiment, a network connection method for conducting transactions over a network is disclosed. A first transaction is initiated over a network at a server. The first transaction is evaluated to select first protocol attributes. A first connection, servicing the first transaction, between the server and a first node is configured according to the first protocol attributes. A second transaction is initiated over the network at the server. The second transaction is evaluated to select second protocol attributes. A second connection, servicing the second transaction, between the server and a second node is configured according to the second protocol attributes, where the first attributes affect the operation of the protocol differently than the second attributes affect the operation of the protocol.

Techniques for modifying the performance of a transport layer protocol in response to a request for content are disclosed. A connection can be established between a content distribution server and an end user computer according to preconfigured parameters. When a request for content is received over the connection, the content distribution server can determine one or more parameters relating to the performance of the connection using information from the request. The content distribution server can modify the connection at the transport layer according to the one or more parameters. Thereafter, the transport layer can manage delivery of the requested content to the end user computer in accordance with the modified parameters. In various embodiments, the content distribution server includes a modified TCP protocol stack which adjusts timing, pacing, and buffer allocation associated with a connection in response to requests from an application-layer data source.

In one embodiment, a method for managing delivery of content in a system comprising a server and an end user computer is disclosed. The method includes establishing a first connection at the server for communicating with the end user computer and receiving a request for content from the end user computer over the first connection. The method also includes determining one or more parameters relating to the performance of the first connection using information from the request and modifying the first connection at the transport layer based on the one or more parameters. Modifying the first connection can be done without notifying the end user computer. The method also includes sending the requested content from the server to the end user computer such that the transport layer manages delivery of the content in accordance with the modified parameters.

Optionally, the method includes retrieving metadata associated with a requested file and modifying the first connection based on the metadata. Alternatively or additionally, the method can include selecting a predetermined performance profile for the first connection using the information from the request and modifying the first connection based on the predetermined performance profile. The method can include determining a connection type of the end user computer and a latency characteristic associated with the connection type and modifying the first connection at the transport layer based on the latency characteristic. The method can also include determining a data size of the requested content, measuring a round trip time between the server and the end user computer when the data size exceeds a predetermined value, and modifying the first connection at the transport layer based on the size of the requested content and the round trip time.

In another embodiment, a content distribution server is disclosed. The server includes a network interface, a processor, a protocol handler, and a data source. The network interface includes a plurality of ports for sending and receiving data over a connecting network. The processor is coupled to the network interface and manages a plurality of connections to end user computers. The protocol handler establishes the connections with the end user computers according to preconfigured transport layer parameters of the content distribution server and manages the manner in which data is transmitted over the connections. The data source supplies the requested content. The data source monitors a first connection for a request, determines one or more modified transport layer parameters based on the request, and directs the protocol handler to modify the first connection independently of the other connections based on the one or more transport layer parameters.

In still another embodiment, a content distribution server is disclosed. The server includes means for sending and receiving data over a connecting network, means for managing a plurality of connections to end user computers, and means for establishing a connection with each end user computer according to preconfigured transport layer parameters. The server includes means for managing data transmission over the plurality of connections, means for modifying a connection based on one or more transport layer performance parameters, and means for supplying requested content to the end user computers over the plurality of connections. The server also includes means for monitoring a first connection for a content request, means for determining the one or more transport layer performance parameters for the first connection based on the request, and means for sending the requested content over the first connection modified by the one or more transport layer performance parameters.

In yet another embodiment, a computer program product comprising a computer-readable medium is disclosed. The computer-readable medium is encoded with one or more sequences of one or more instructions which, when executed by a processor, perform steps of establishing a first connection at the server for communicating with an end user computer and receiving a request for content from the end user computer over the first connection. The instructions operate to determine one or more parameters relating to the performance of the first connection based on information from the request and to modify the first connection at the transport layer using the one or more parameters without notifying the end user computer. Additionally, the instructions operate to send the requested content from the server to the end user computer such that the transport layer manages delivery of the content in accordance with the modified parameters.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

FIGS. 8A, 8B, and 8C show exemplary data elements such as can be used with a content distribution server.

In the figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF EMBODIMENTS

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It being understood that various changes may be made in the function and arrangement of elements without departing from the spirit and scope as set forth in the appended claims.

Figure 1:
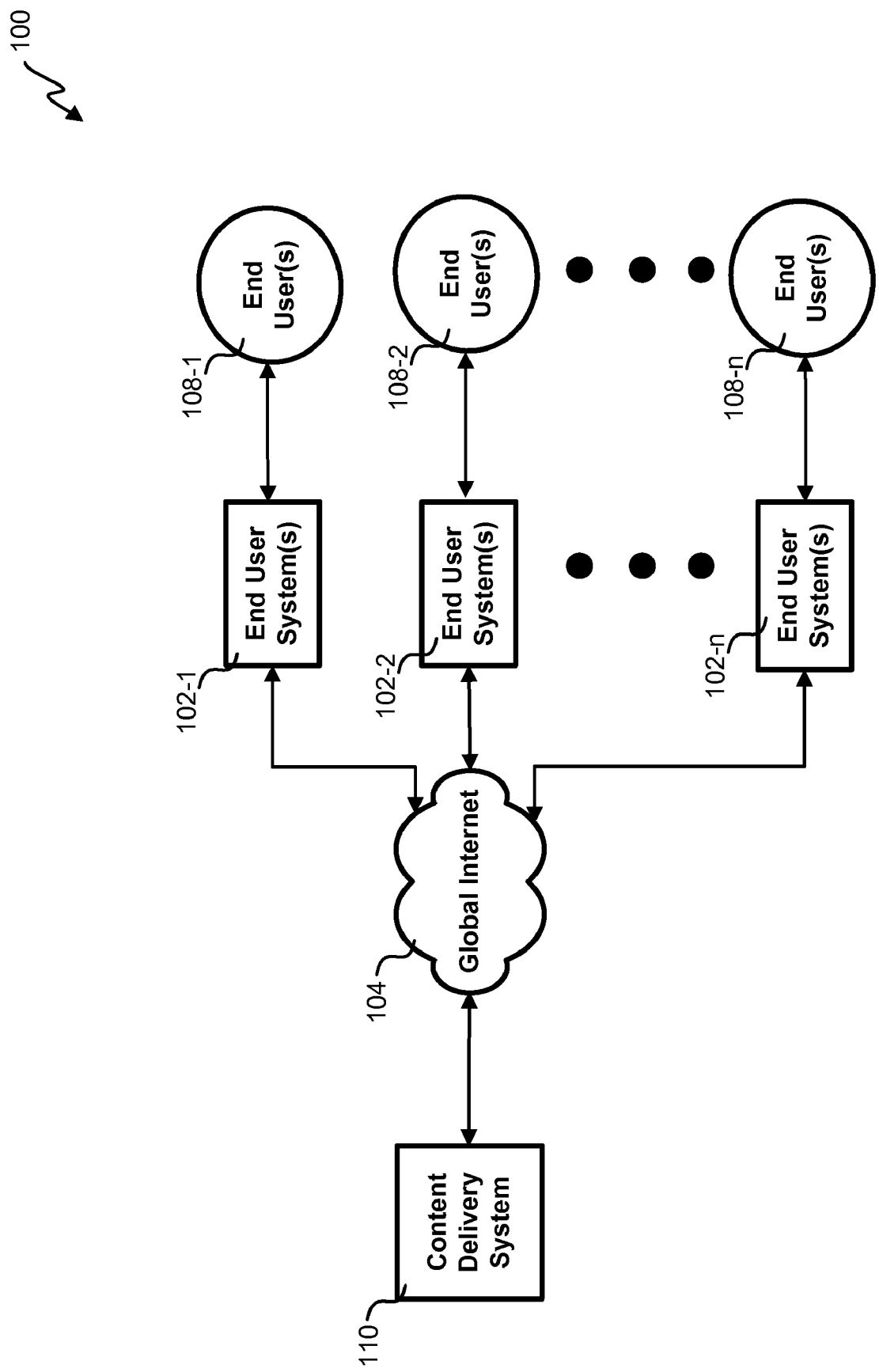
FIG. 1 depicts a block diagram of an embodiment of a content delivery system.

Referring first to FIG. 1, a block diagram of an embodiment of an Internet content delivery system 100 is shown. Generally, one or more nodes request content from one or more other nodes. In FIG. 1, a number of end users 108 respectively use their end user system or client 102 to download and view content objects from the global Internet 104. The content delivery system 110 has one or more servers that provide content object downloads. The content delivery system 110 can include any number of cache servers, application servers, content servers, service servers, and/or database servers to provide content to the clients 102. Although this embodiment shows particular communication pairs, other embodiments could communicate between any pair of nodes on a network, including between pairs of clients or between pairs of servers, and yet other embodiments could communicate among more than two nodes, such as in a broadcast or multicast implementation.

With reference to FIGS. 2A, 2B, 2C and 2D, embodiments of a content download pair 200 that sends content from a server 206 to a client 102 are shown. A primary embodiment described here is the interoperation of two nodes 102, 206 on the Internet communicating using TCP, one node being a client 102 that requests information, such as web page content, multimedia, or software downloads, and the second node being a server 206 that provides information in response to a request. TCP operates in the transport layer of the seven-layer Open Systems Interconnection (OSI) model. In other embodiments, nodes 102, 206 interoperate in ways other than communication in a network, such as sharing data within a computer or group of computers across an available system or intersystem interface; interoperate using communications networks other than the Internet 104, such as a private communications network; interoperate using the Internet 104 or a private network using protocols other than TCP, such as UDP, RTP, multicast protocols, and other standard protocols in the transport layer; interoperate using the Internet 104 or a private network using standard protocols operating in a layer that underlies the transport layer; interoperate, using standard protocols and the Internet or a private network, more than two at a time, such as in clusters or multicast groups; or interoperate, using standard protocols and the Internet or a private network, other than as a client and server, including interoperating as peers, as collaborative nodes, or as a group of nodes under the common control of one or more other nodes or under the common control of a controller.

In the primary embodiment, the server 206 conditionally adapts the attributes of the TCP protocol for each TCP connection established by a client 102. Conditionally adapting the attributes of the TCP protocol does not require changes to standard TCP protocol implementations at every node, does not require special components be installed in the TCP protocol implementation at every node, and therefore does not comprise implementing a customized protocol as previously described; rather, the primary embodiment utilizes the standard TCP protocol and the attributes implemented in it. In other embodiments, the server conditionally adapts the attributes of other transport-layer protocols for each session established by a client 102; the server conditionally adapts the attributes of other protocols that underlie the transport layer for each session established by a client 102; the server 206 conditionally adapts the attributes of the TCP protocol or other protocol for groups of connections or sessions established by clients 102; the server 206 conditionally adapts the attributes of the TCP protocol or other protocol for connections or sessions established by groups or subsets of groups of clients 102; the client 102 conditionally adapts the attributes of the TCP protocol for each TCP connection established; the client 102 conditionally adapts the attributes of other protocols for each session established; the client 102 conditionally adapts the attributes of the TCP protocol or other protocol for groups of connections or sessions; a node conditionally adapts the attributes of the TCP protocol or other protocol for each connection or session; a node conditionally adapts the attributes of the TCP protocol or other protocol for groups of connections or sessions; a node conditionally adapts the attributes of the TCP protocol or other protocol for connections or sessions established by groups or subsets of groups of nodes; a controller conditionally adapts the attributes of the TCP protocol or other protocol for each connection or session of at least one node of an interoperating group of nodes; a controller conditionally adapts the attributes of the TCP protocol or other protocol for groups of connections or sessions of at least some nodes of an interoperating group of nodes; or, a controller conditionally adapts the attributes of the TCP protocol or other protocol for connections or sessions established by groups or subsets of groups of nodes.

Software, software modifications, or equivalent function, may optionally be implemented at a server, client, or node that sets the conditionally adapted protocol attributes of a connection or session, but need not be implemented at servers, clients, or nodes that passively participate in a conditionally adapted protocol connection or session. Such software, software modifications, or equivalent function will only be needed if existing protocol software or other software on the server, client, or node does not provide a facility for programmatically or similarly changing attributes of the protocol that is used; in this event, software, a software modification, or equivalent facilities to provide such a programmatic or similar interface may be implemented.

Conditionally adapting the protocol for each connection or session, or collection of connections or sessions, results in at least one node that, concurrently or over time, uses a protocol for multiple unrelated connections or sessions wherein the protocol attributes vary, at least initially and sometimes persistently, from one connection to another, most often varying differently from any ordinary protocol attribute variations that naturally occur from one connection or session to another through use of the standard protocol implementation among heterogeneous nodes.

In the primary embodiment, TCP connections are established in order to use HyperText Transfer Protocol (HTTP) to communicate information requests from clients 102 to servers 206 and responses from servers 206 to clients 102. HTTP is a scheme that operates above, and depends on the presence of a functioning and reliable protocol at, the transport layer of the seven-layer model developed in the Open Systems Interconnection (OSI) initiative. Other embodiments use application-layer protocols other than HTTP in conjunction with TCP; use TCP alone, i.e., without HTTP; use other protocols; or, use other application-layer protocols in conjunction with other protocols. HTTP utilizes Uniform Resource Locators (URLs), Uniform Resource Names (URNs), and Uniform Resource Identifiers (URIs) to identify information. URLs are used in the primary embodiment. Other embodiments use URIs, URNs, other identifiers, or other information. A URL begins with the scheme identifier, which identifies the namespace, purpose, and syntax of the remainder of the URL. In the primary embodiment utilizing HTTP, the typical scheme is "http". The scheme is followed by a host field, which contains the IP address or name of the host where the requested information can be found, optionally followed by a port number, optionally followed by a path, which is an HTTP selector, optionally followed by a search portion, which is a query string. The full URL, then, is an alphanumeric string containing the scheme, host field, any optional following strings, and special characters such as ":", "/", and "?" that are reserved for special functions such as designating a hierarchical structure in the URL. Other embodiments could use different application-layer protocols such as Telnet, File Transfer Protocol (FTP), secure HTTP (HTTPS), and Simple Mail Transfer Protocol (SMTP).

In the primary embodiment, the server 206 bases the conditional adaptation of the attributes of the TCP protocol on the alphanumeric URL string provided by the client 102 in its information request. In another embodiment, a server, client or other node bases the conditional adaptation of the attributes of the TCP protocol or other protocol on the application-layer protocol specified or on identifying information, equivalent to a URL, or other information provided in, or characteristic of, an information request, connection, or session. In other embodiments, a server, client or other node bases the conditional adaptation of the attributes of the TCP protocol or other protocol on the IP address of one or more servers, clients, or nodes; on network information associated with the IP address of one or more servers, clients, or nodes, including the Autonomous System (AS) number, identity of network operator, geographic location, logical or physical network location, logical or physical network segment, or network interconnection characteristics associated with the IP address(es) of one or more servers, clients, or nodes; the geographic location of the server, client or node; and/or, the logical or physical network location of the server, client or node; the logical or physical address of the server, client or node; the logical or physical name of the server, client or node; and/or, the network or other path from or to a server, client or node. In other embodiments a server, client or node bases the conditional adaptation of the attributes of the TCP protocol or other protocol on recent network performance measurements, including latency, jitter, packet loss, round trip time, and/or the measured variance in a network performance measurement across multiple samples; on recent measures of utilization of a network, network segment, network interface, or network port; and/or, on recent measurements of performance or utilization of a server, group of servers, or server component(s) such as memory, processor, disk, bus, intersystem interface, and/or network interface. In still other embodiments, a server, client or node bases the conditional adaptation of the attributes of the TCP protocol or other protocol on temporal factors, including time of day; day of week, month, or year; specific date; occurrence of a holiday or religious observance; occurrence of a temporal event such as a news event or sports event; seasonal occurrence; and/or a scheduled event or time period.

In the primary embodiment, the protocol attribute selector 212 of the server 206 compares the alphanumeric URL string provided by the client 102 in its information request to a table 220 containing partial or whole URLs and identifies the most specific match from left to right that it can find in the table 220. In another embodiment, the server 206 compares a subset of the alphanumeric string, for example some or all of the characters in the query string, or the characters following the host field up to the first subsequent slash (i.e., "/"), to a table 220. In another embodiment, the client or node 102 makes a conditional adaptation of protocol attributes, using the alphanumeric URL string or a subset of it. In other embodiments, the alphanumeric URL string or a subset of it is processed to obtain a value or indicator that is used to determine a conditional adaptation of protocol attributes. In other embodiments, the information used to determine the conditional adaptation of protocol attributes is identifying information equivalent to a URL, one or more IP addresses, network information associated with one or more IP addresses, network interconnection characteristics associated with one or more IP addresses, or the geographic location, or logical or physical network location, of a server, client or node. In other embodiments, the information used to determine the conditional adaptation of protocol attributes comprises one or more recent performance measurements or thresholds related to one or more servers, clients, or nodes, or groups of servers, clients, or nodes, or related to one or more networks, network segments, network components, or network interfaces, or groups of network segments, network components, or network interfaces; rates or amounts of variation in one or more performance measurements or thresholds related to one or more servers, clients, or nodes, or groups of servers, clients, or nodes, or related to one or more networks, network segments, network components, or network interfaces, or groups of network segments, network components or network interfaces; rates or amounts of resource utilization, including utilization related to one or more servers, clients, or nodes, or groups of servers, clients, or nodes, or components of one or more servers, clients, or nodes, groups of components of servers, clients, or nodes, or related to one or more networks, network segments, network components, or network interfaces, or groups of network segments, network components, or network interfaces; rates or amounts of variation in resource utilization, including variation in utilization related to one or more servers, clients, or nodes, or groups of servers, clients, or nodes, or components of one or more servers, clients, or nodes, groups of components of servers, clients, or nodes, or related to one or more networks, network segments, network components, or network interfaces, or groups of network segments, network components, or network interfaces; and/or, thresholds of resource utilization, including utilization related to one or more servers, clients, or nodes, or groups of servers, clients, or nodes, or components of one or more servers, clients, or nodes, groups of components of servers, clients, or nodes, or related to one or more networks, network segments, network components, or network interfaces, or groups of network segments, network components, or network interfaces.

Figure 2A:
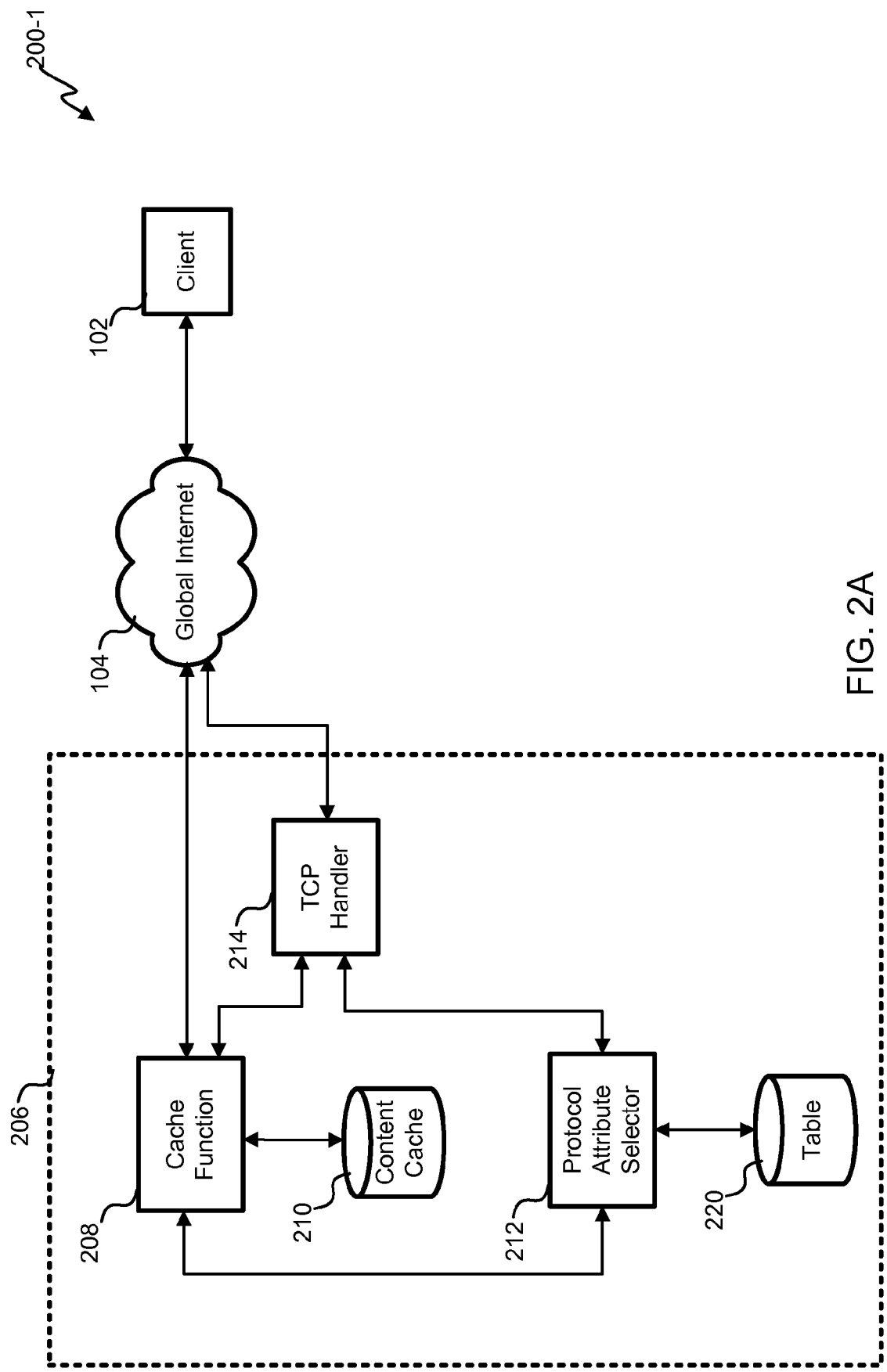
FIGS. 2A, 2B, 2C, and 2D depict block diagrams of embodiments of a content download pair that sends content from a server to a client.
Figure 2B:
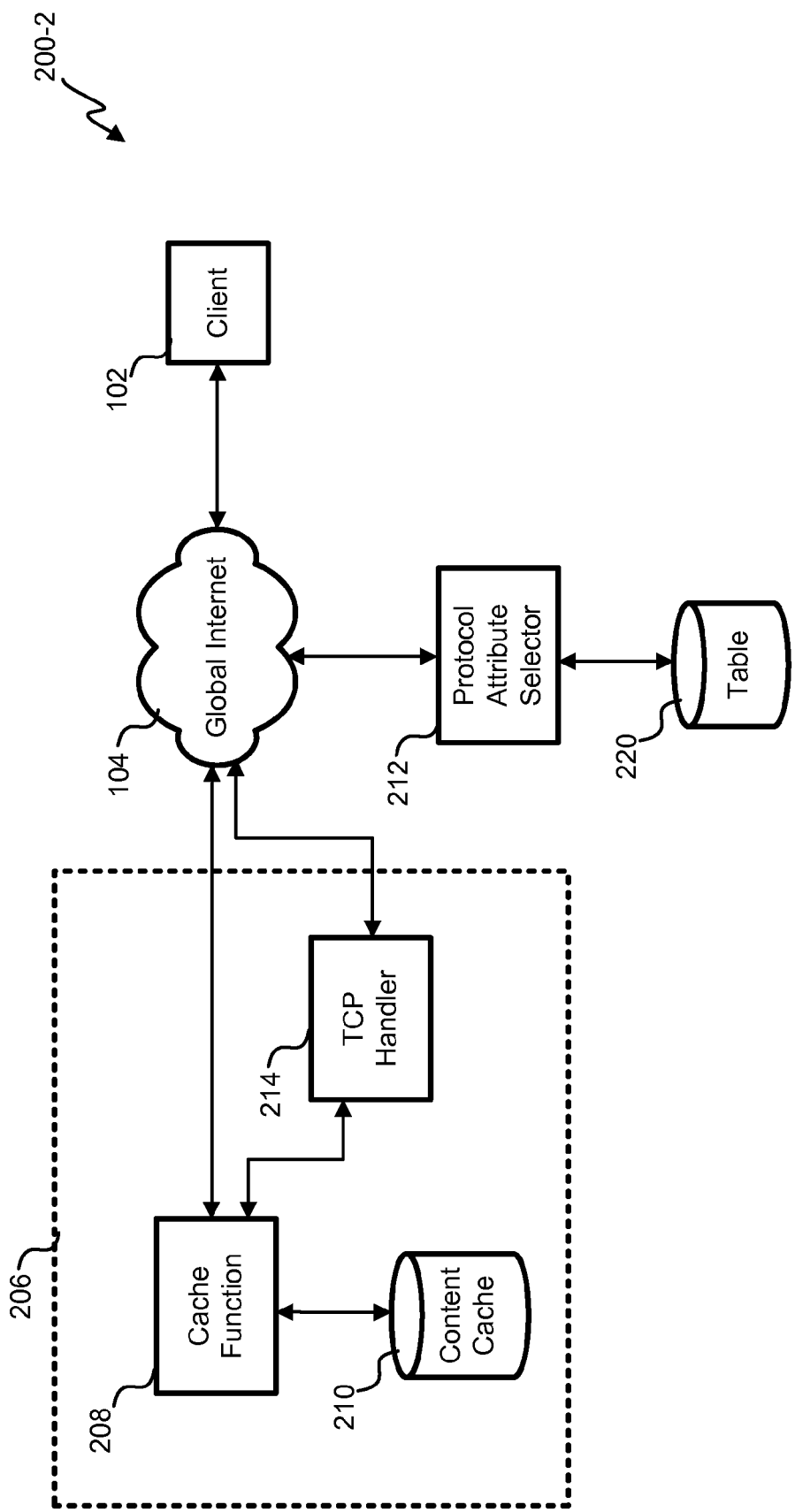
Figure 2C:
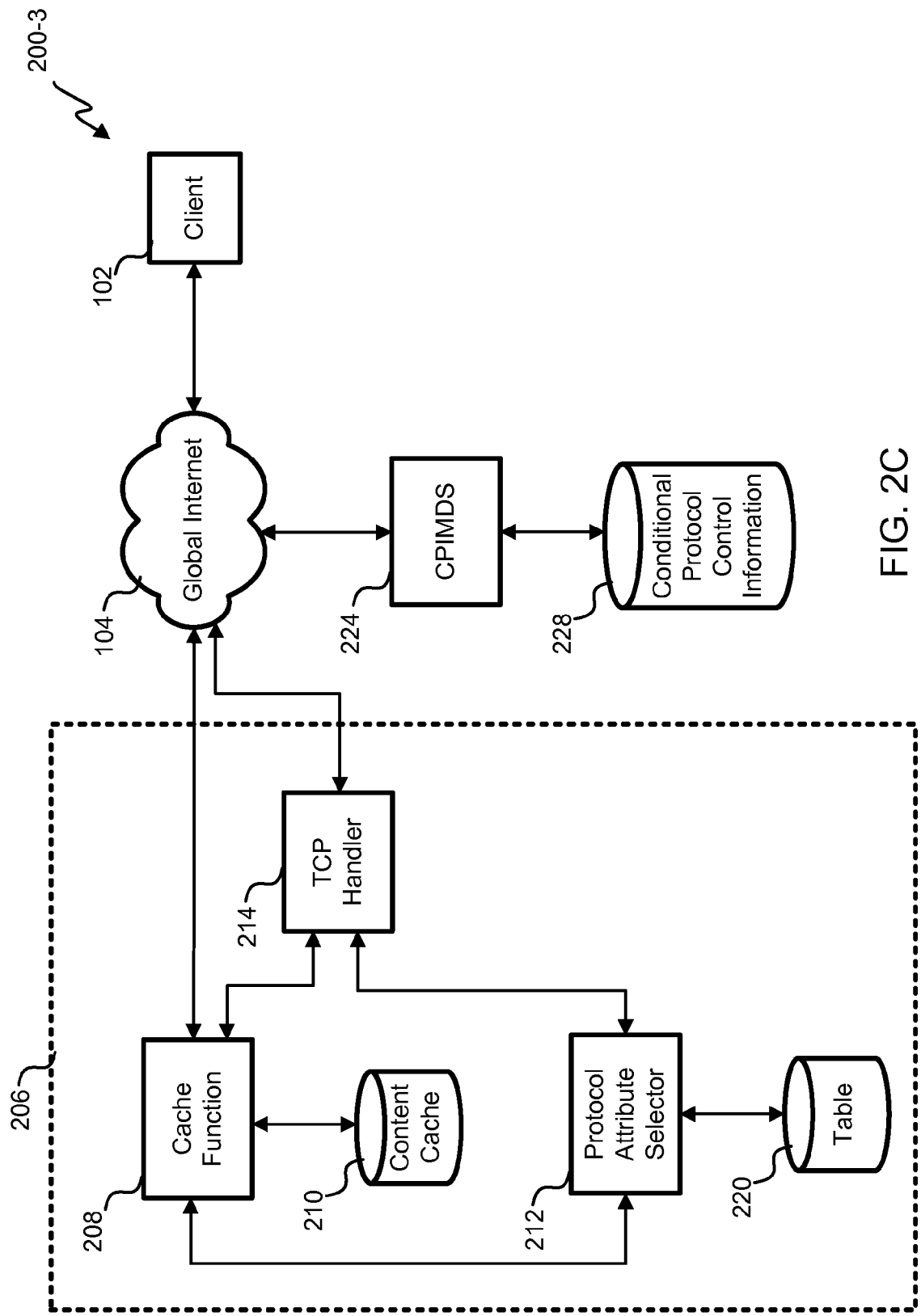
Figure 2D:
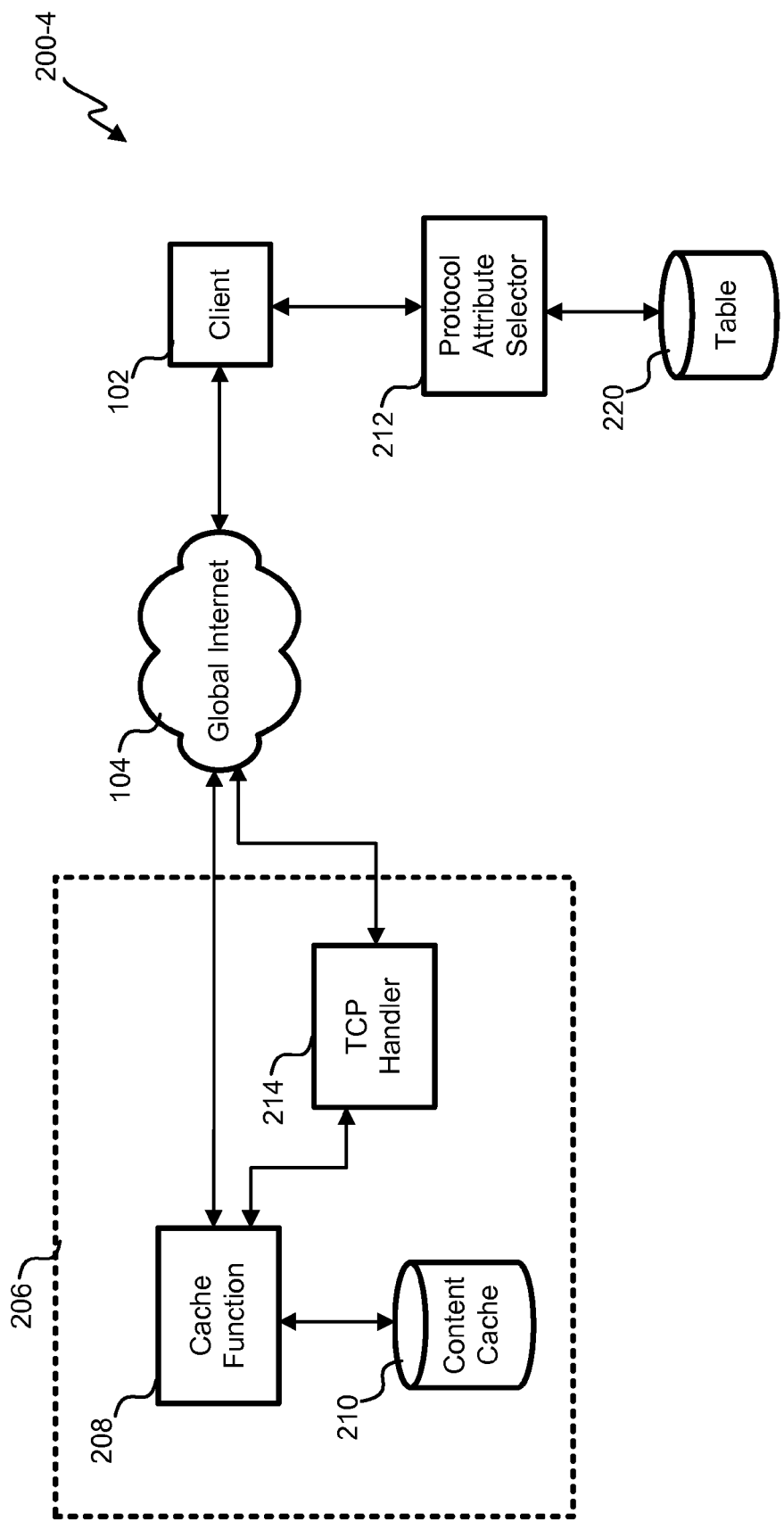

In the primary embodiment, a table 220 containing partial or whole URLs for comparison by the protocol attribute selector 212 is stored on the server 206. In other embodiments, a table 220 containing partial or whole URLs for comparison, or subsets of the alphanumeric URL string used for comparison, is stored remotely from the server 206 such as the embodiment shown in FIG. 2B and the comparison of the alphanumeric URL string or subset of the alphanumeric URL string is made at the server 206, or is made at the remote table storage location or at another location and the result of the comparison, or an indicator of the result of the comparison, or the protocol attributes to be used, are returned to the server 206. In other embodiments, a table 220 or database of information used for comparison is stored at the server 206, or is stored remotely from the server 206 and one or more comparisons are made at the server 206, or are made at the remote storage location or at another location, and the results of the comparisons, or one or more indicators of the results of the comparisons, or the protocol attributes to be used, are returned to the server 206. In yet other embodiments, a table 220 containing partial or whole URLs for comparison, or subsets of the alphanumeric URL string used for comparison, or a database of information used for comparison is stored at a client or node 102 as is shown in FIG. 2D, or is stored remotely from a client or node and one or more comparisons are made at the client or node 102, or are made at the remote storage location or at another location and the results of the comparisons, or one or more indicators of the results of the comparisons, or the protocol attributes to be used, are returned to the client or node 102. In other embodiments, a protocol attribute to be used, or an indicator of a protocol attribute to be used, is extracted from, or derived from, a URL or equivalent identifying information used by a server, client, or node; is extracted from, or derived from, address information or a whole or partial name of a server, client, or node; is extracted from, or derived from a user name or identifier, class or type of user, group of users, or selection of users, optionally as associated with a service, server, client, or node; is extracted from, derived from, or associated with, an application or class or group of applications, a service or class or group of services, or a database or equivalent source of data or a class or group of databases or sources of data; is extracted from, or derived from, the identifier of a standard protocol, a standard protocol message (for example, a TCP SYN), the protocol-level content of a message, or protocol message headers or equivalent information; is derived from all or a part of the time, all or a part of the date, or all or a part of the duration since a time or date; is determined according to a sequence or progression; and/or, is determined randomly or pseudo-randomly.

After one or more comparisons are made, or after the extraction or derivation of a value, or after an association or determination is made, the server, client, or node will have one or more values it can use as protocol attributes or as indicators of which protocol attributes to use; or, if there has not been a determination of a condition resulting in one or more protocol attribute values to use, then in the primary embodiment the server 206 will use the standard values for the protocol attributes as configured for the server 206, and in other embodiments, the server, client, or node will use the standard values as configured for it for some or all of the protocol attributes; the server, client, or node will use another default value for some or all of the attributes; the server, client, or node will use the last-used values for some or all of the attributes; or, the server, client, or node will use randomly, pseudo-randomly, or arbitrarily determined values for some or all of the attributes.

In the primary embodiment, the server 206 is a cache server, typically operating in a group of cache servers, and groups of cache servers are distributed at numerous points on the global Internet. The server 206 includes a cache function 208 coupled to a content cache 210 to provide caching of content for the server 206. In another embodiment, the server 206 is a cache server operating individually, or independently from other cache servers. In other embodiments, the server 206 is a content server that provides content; a content server operating in a group of content servers; a content server operating in a group of content servers distributed at numerous points on the global Internet; an application server that supports one or more applications; an application server operating in a group of application servers; an application server operating in a group of application servers distributed at numerous points on the global Internet; a service server that provides one or more services; a service server operating in a group of service servers; a service server operating in a group of service servers distributed at numerous points on the global Internet; a database server that provides data; a database server operating in a group of database servers; a database server operating in a group of database servers distributed at numerous points on the global Internet; a server operating in a heterogeneous group of servers; or, a server operating in a heterogeneous group of servers distributed at numerous points on the global Internet.

In the primary embodiment, each server 206 has an identical copy of a table 220 containing partial or whole URLs to which the alphanumeric URL string provided by the client 102 in its information request will be matched if possible, along with an indicator of the protocol attribute values to be used when that match occurs or the actual protocol attribute values themselves to be used when that match occurs. The table 220 can be modified from time to time, including adding new entries, changing the contents of existing entries, and deleting entries. Any time that a new version of the table 220 is created, copies of that version are distributed to servers 206 in the global group of cache servers. Optionally, the table 220 can have an expiration date and time, after which the server 206 will stop using the table 220 if it is out-of-date and has not been replaced with an updated table. In the primary embodiment, the conditional protocol control information is combined with other information distributed to servers 206 so as to minimize to the extent practicable the number of tables 220 that are distributed to, and synchronized among, the global group of servers; in another embodiment, this combination and minimization is not implemented; and this combination and minimization is not done in most or all other embodiments.

In other embodiments, the conditional protocol information may be in the form of a table 220 as in the primary embodiment, or may be in the form of multiple tables, or may be in the form of one or more data files, one or more databases, one or more calculated or derived elements, one or more calculated or derived groups of elements, one or more individual equations or formulas, one or more groups of equations or formulas, one or more individual expressions, one or more groups of expressions, one or more individual programs or routines, one or more groups of programs or routines, one or more individual listings, one or more groups of listings, and/or other forms equivalent to any of these.

In other embodiments, the conditional protocol control information contains partial or whole URLs to which the alphanumeric URL string provided by the client 102 in its information request will be matched if possible, along with an indicator of the protocol attribute values to be used when that match occurs or the actual protocol attribute values themselves to be used when that match occurs, and is the same for each server 206 at a location, but varies from one location to another; is the same for each server in a region, but varies from one region to another; or, is different at each server. In other embodiments the conditional protocol control information contains partial or whole URLs to which the alphanumeric URL string used by a client or node 102 will be matched if possible, along with an indicator of the protocol attribute values to be used when that match occurs or the actual protocol attribute values themselves to be used when that match occurs, and the conditional protocol control information is identical at each client or node 102; is the same for each client or node 102 in a group, but varies from one group of clients or nodes 102 to another; is the same for each client or node 102 in a region, but varies from one region to another; or, varies from one client or node 102 to another client or node 102.

In other embodiments, the conditional protocol control information contains other comparison information that will be matched, if possible, along with a corresponding indicator of the protocol attribute values to be used when that match occurs or the corresponding actual protocol attribute values themselves to be used when that match occurs, and each server, client, or node has an identical copy of the conditional protocol control information; the conditional protocol control information is the same for each server, client, or node at a location, but varies from one location to another; the conditional protocol control information is the same for each server, client, or node in a region, but varies from one region to another; the conditional protocol control information is the same for each server, client, or node in a group, but varies from one group to another; or, the conditional protocol control information varies from one server, client, or node to another. In these embodiments, the comparison information can include subsets of the alphanumeric URL string; identifying information equivalent to a URL; one or more IP addresses; network information associated with one or more IP addresses; network interconnection characteristics associated with one or more IP addresses; the geographic location, or logical or physical network location, of a server, client, or node; a value of a performance measurement or threshold; a rate or amount of variation in a performance measurement or threshold; a rate or amount of resource utilization; a rate or amount of variation in resource utilization; a threshold of resource utilization; addresses, names, classes, types, or group identifiers of servers, clients, nodes, users, applications, services, databases, or other data sources; protocol identifiers, protocol message identifiers or attributes, or protocol message headers or attributes; times, dates, or intervals; and/or, sequences, ratios, progressions, equations, randomly generated data, or arbitrarily determined data.

In embodiments where the conditional protocol control information is not identical at all servers, clients, or nodes, optionally a system can create conditional protocol control information for each location, region, server, client, or node, and optionally can manage the distribution of the conditional protocol control information to each location, region, server, client, or node. For partial or whole URLs, subsets of a URL alphanumeric string, or other comparison information that will be compared, a conditional protocol information management and distribution system (CPIMDS) optionally generates, or stores, or generates and stores, protocol attributes for any or all of a server, all servers, a subset of servers, a location, all locations, a subset of locations, a region, all regions, a subset of regions, a group, all groups, a subset of groups, an application, all applications, a subset of applications, a service, all services, a subset of services, a database or data source, all databases or data sources, a subset of databases or data sources, a protocol, all protocols, a subset of protocols, a client, all clients, a subset of clients, a node, all nodes, a subset of nodes, or a combination of some, a subset of, a subset of some of, or all of, servers, locations, regions, groups, applications, services, databases or data sources, protocols, clients, or nodes; and optionally generates, or stores, or generates and stores, default protocol attributes to be used in the absence of a matching comparison for any or all of a server, all servers, a subset of servers, a location, all locations, a subset of locations, a region, all regions, a subset of regions, a group, all groups, a subset of groups, an application, all applications, a subset of applications, a service, all services, a subset of services, a database or data source, all databases or data sources, a subset of databases or data sources, a protocol, all protocols, a subset of protocols, a client, all clients, a subset of clients, a node, all nodes, a subset of nodes, or a combination of some, a subset of, a subset of some of, or all of, servers, locations, regions, groups, applications, services, databases or data sources, protocols, clients, or nodes. The CPIMDS also optionally generates, or stores, or generates and stores, one or more rules for determining which of the server, location, region, group, application, service, database or data source, protocol, client, node, or combined values to use when determining a comparison to be included in the conditional protocol control information for a server, all servers, a subset of servers, a location, all locations, a subset of locations, a region, all regions, a subset of regions, a group, all groups, a subset of groups, an application, all applications, a subset of applications, a service, all services, a subset of services, a database or data source, all databases or data sources, a subset of databases or data sources, a protocol, all protocols, a subset of protocols, a client, all clients, a subset of clients, a node, all nodes, a subset of nodes, or a combination of some, a subset of, a subset of some of, or all of, servers, locations, regions, groups, applications, services, databases or data sources, protocols, clients, or nodes; optionally generates, or stores, or generates and stores, one or more rules for determining when to create, or distribute, or create and distribute, conditional protocol control information for or to a server, all servers, a subset of servers, a location, all locations, a subset of locations, a region, all regions, a subset of regions, a group, all groups, a subset of groups, a client, all clients, a subset of clients, a node, all nodes, a subset of nodes, or a combination of some or all of servers, locations, regions, groups, clients, nodes, or a subset of servers, locations, regions, groups, clients, nodes, or for or to all servers, clients, or nodes; optionally generates, or stores, or generates and stores, one or more rules for determining whether, and if so when, any conditional protocol control information shall expire; optionally includes an expiration value with some or all of the conditional protocol control information; and, optionally distributes conditional protocol control information to a server, all servers, a subset of servers, a location, all locations, a subset of locations, a region, all regions, a subset of regions, a group, all groups, a subset of groups, a client, all clients, a subset of clients, a node, all nodes, a subset of nodes, or a combination of some or all of servers, locations, regions, groups, clients, nodes, or a subset of servers, locations, regions, groups, clients, nodes, or for or to all servers, clients, or nodes.

In embodiments where the conditional protocol control information is maintained separately from each server, client, or node, the conditional protocol control information can optionally include, or can optionally correlate to, an indication of for which servers, locations, regions, groups, applications, services, databases or data sources, protocols, clients, nodes, or supersets, subsets, or combinations thereof, the conditional protocol control information can be used in adapting protocol attributes. The conditional protocol control information can be maintained at a single location or multiple locations; if maintained at multiple locations, each location can maintain a complete copy of all conditional protocol control information, or each location can maintain a copy of a subset of the conditional protocol control information. Optionally, a conditional protocol information management and distribution system can create conditional protocol control information for, and optionally distribute conditional protocol control information to, each conditional protocol control information location, groups of conditional protocol control information locations, or all conditional protocol control information locations. If conditional protocol control information locations store a subset of the conditional protocol control information, participating servers, clients, or nodes can optionally use a table, ordered table, shuffled table, directory, logical name translation system, or information obtained from, or received from, another server, client, node, or controller, to determine which conditional protocol control information location to receive conditional protocol control information from.

Figure 3:
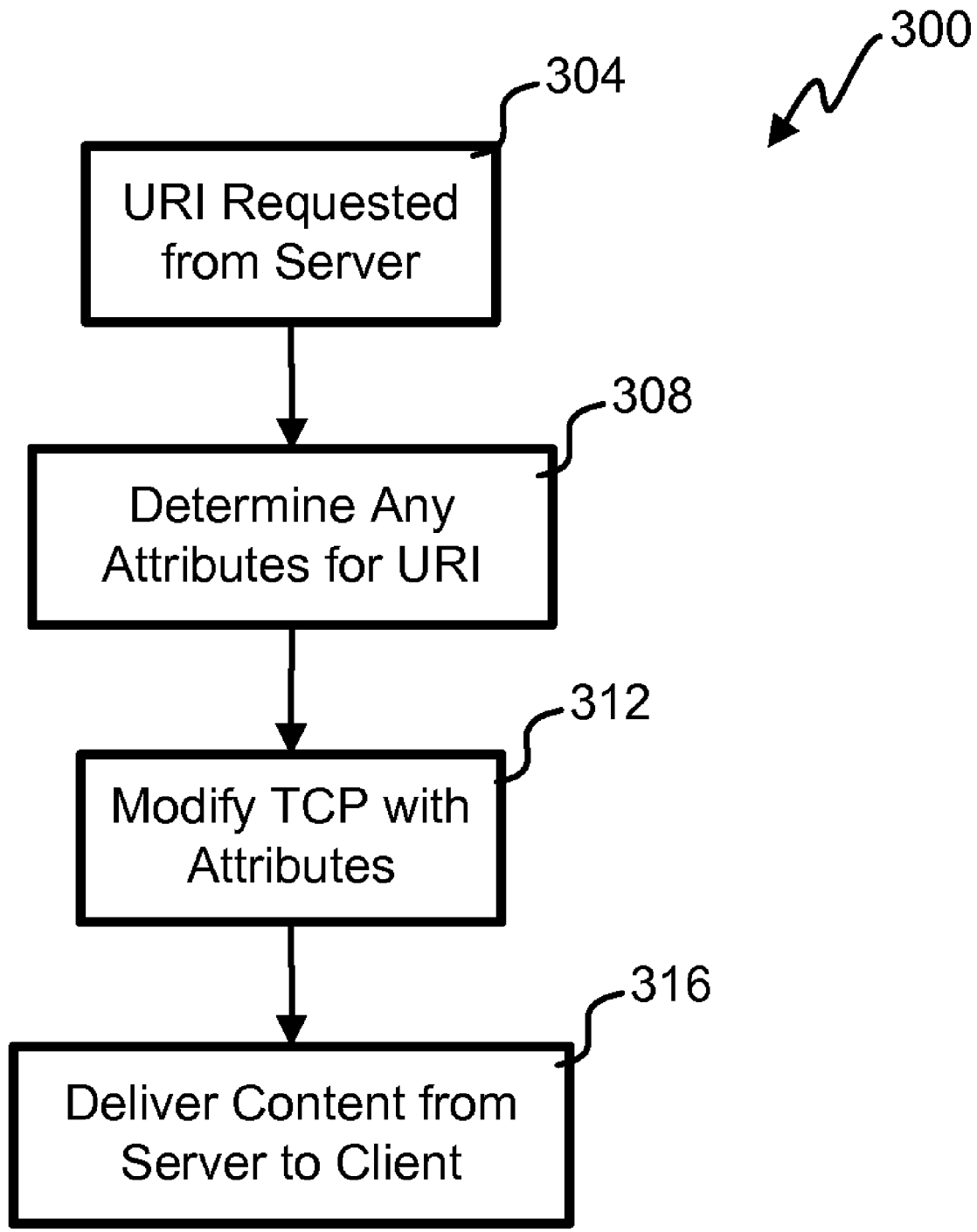
FIG. 3 illustrates a flowchart of an embodiment of a process for modification of the TCP protocol for various connections to a server.

Referring next to FIG. 3, an embodiment of a process 300 for modification of the TCP protocol for various connections to a server 206. In summary, in the primary embodiment two nodes on the Internet communicate using TCP, one node being a client 102 that requests information in block 304, such as web page content, and the second node being a cache server 206 that provides information in response to a request. The cache server 206 operates as one of a group of cache servers, and groups of cache servers are distributed at numerous points on the global Internet. TCP connections are established in order to use HTTP to communicate information requests from clients 102 to servers 206 in block 304 and responses from servers 206 to clients 102. HTTP utilizes URLs; each URL begins with the scheme "http", which is followed by a host field containing the IP address or name of the host where the requested information can be found, followed by a path, which will be used at the server 206 to locate the requested object or information, optionally followed by a query string. Thus, the full URL typically is an alphanumeric string containing the scheme, host field, path, and any optional query string, each part of which is separated from the other parts by special characters such as ":", "/", and "?". Thus, an example URL referencing content that can be served by the cache server 206 in the primary embodiment might look like:

http://customer1.webserving.com/folderB/directory/logo.gif optionally followed by "?" and a query string. A client 102 requesting this object would send an HTTP message using an HTTP method called "GET" to the server 206 identified by the hostname "customer1.webserving.com" in block 304. The server identification is accomplished through a DNS translation of the hostname into one or more IP addresses. The Domain Name System (DNS) is the name translation system used in the Internet. The HTTP GET message sent to the server 206 typically includes part or all of the URL that the client 102 is requesting. In block 308, some or all of the URL is compared with entries in the table 220 to determine the attributes to use for the connection as described further below.

In the primary embodiment, in block 312 the server 206 conditionally adapts the attributes of the TCP protocol for each TCP connection established by a client 102. Conditionally adapting the attributes of the TCP protocol does not require changes to standard TCP protocol implementations at every node, i.e., any client 102 that supports standard TCP (which virtually all Internet and all World Wide Web clients do) can communicate with the server 206 to get the object via a conditionally adapted TCP connection, but may require a modification to the server's TCP protocol handler to allow changes to be made to the TCP protocol attributes by another program, or on a per-connection basis, or both. Where the TCP protocol handler provides a facility for programmatically making these changes, the content serving application may require an interface enabling it to communicate conditionally adapted TCP protocol attributes to the TCP protocol handler. In the primary embodiment, a set sockets statement can be used to communicate conditionally adapted TCP protocol attributes from the content serving application to the TCP handler 214, which can be a modified TCP software stack that accepts and implements changes to the TCP protocol attributes on a per-connection or per-request basis. In various embodiments, the TCP handler could be implemented in software or hardware or both, and can be implemented as part of a node or separately from the node, for example in a switch or other device that provides protocol services.

Conditionally adapting the protocol for each connection results in the server 206 concurrently using the TCP protocol for multiple unrelated connections, wherein the TCP protocol attributes vary, at least initially and sometimes persistently, from one connection to another. At block 316, the requested object or information is sent from the server 206 to the client 102. When a requested object or information is delivered without any change to the TCP protocol attributes, the standard TCP protocol attributes pre-configured for the TCP protocol handler are used; but when the requested object or information is delivered with conditionally adapted TCP protocol attributes, the conditionally determined TCP protocol attributes are used instead of the standard pre-configured TCP attributes.

A typical caching content server 206 in actual operating use in a web hosting service provider environment may typically service 2,000 to 3,000 requests per second, across 100 to 200 (or more) customers. If half of these requests will use changed TCP protocol attributes and half will not, then on average, half of the connections managed by the server 206 at any one point in time would use the changed TCP protocol attributes and half would use the standard TCP protocol attributes as pre-configured in the TCP handler 214. Additionally, if there are five separate (different) changed TCP protocol attribute sets across which those requests using changed TCP protocol attributes are evenly distributed, then on average at any one point in time a server 206 would concurrently be operating TCP connections with six different sets of TCP protocol attributes: 50% of the connections would utilize standard pre-configured TCP protocol attributes, and 10% would utilize each of the five possible changed TCP protocol attribute sets.

In the primary embodiment, the server 206 bases the conditional adaptation of the attributes of the TCP protocol on the alphanumeric URL string provided by the client 102 in the HTTP GET message. In the primary embodiment, the conditional protocol control information is in the form of a table 220 containing partial and/or whole URLs for comparison, the table 220 is stored on the server 206, and the table 220 is generally kept reconciled on all servers 206. The server 206 compares the alphanumeric URL string provided by the client 102 in the GET request to the table 220 and identifies the most specific match from left to right that it can find in the table 220 in block 308. Taking our earlier example and assuming a simplified table, the sole Table shows mappings from whole and/or partial URLs into TCP attribute sets comprising specific protocols attributes (identified as "attr1", "attr2", "attr3", etc.) to be used and the appropriate value or setting for that use of that attribute.

| Table Mapping to TCP attribute sets | |
|---|---|
| Partial URL | TCP Attribute Set |
| http://customer1.webserving.com/folderA/ | attr1 = yes, attr3 = 25, attr4 = low |
| http://customer1.webserving.com/folderB/ | attn = no, attr2 = 1, attr4 = high |
| fastnet.com | attr3 = 50, attr6 = fast |
| http://customer2.webserving.com/ | |
| http://customer3.webserving.com/ | attr1 = yes, attr3 = 25, attr4 = low |

The URL in the example above, "http://customer1.webserving.com/folderB/directory/logo.gif," would be matched against the second line-entry in the table. The TCP protocol attribute set (group of TCP protocol attributes) to be used for the TCP connection that services, or responds to, this HTTP GET message from this client 102 would be "attr1=no, attr2=1, attr4=high" and the TCP protocol attributes for this TCP connection would be set accordingly. This simplified table example also illustrates that the scheme and host name may be sufficient for a matching entry, such as in the case of the entry "http://customer3.webserving.com," or the host name alone may be sufficient, such as in the case of the entry "fastnet.com." This simplified table example also illustrates that there may be a null entry in the table, as in the case of "http://customer2.webserving.com"; in this simplified table example, the null entry signifies use of the standard preconfigured TCP protocol attributes. Note that an actual table in the primary embodiment would contain more information than the simplified example table shown here, as discussed.

The table 220 can be modified from time to time, including adding new entries, changing the contents of existing entries, and deleting entries. When a new version of the table 220 is created, copies of the new version of the table 220 are distributed to the servers 206 in the global group of cache servers. Optionally, the table 220 can have an expiration date and time, after which the server 206 will stop using the table 220 if it is out-of-date and has not been replaced with an updated table 220; under this condition, the server 206 would then use the standard TCP protocol attributes for connections until the server 206 received an updated or unexpired table 220.

In the primary embodiment, the conditional protocol control information is combined with other information, such as customer billing codes and other customer-specific information, that is distributed to all servers 206, in order to minimize the number of tables that are distributed to, and reconciled throughout, the global group of servers. This embodiment has the advantage of simplifying administration, change management, and rollback in the event that distribution of a new table 220 causes a problem or error condition, but the disadvantage that the conditional protocol adaptation is the same for any given entry in the table 220 at every server 206, regardless of the server's location or other factors. In other embodiments, as discussed, the conditional protocol control information can vary from one server 206 to another.

Figure 4:
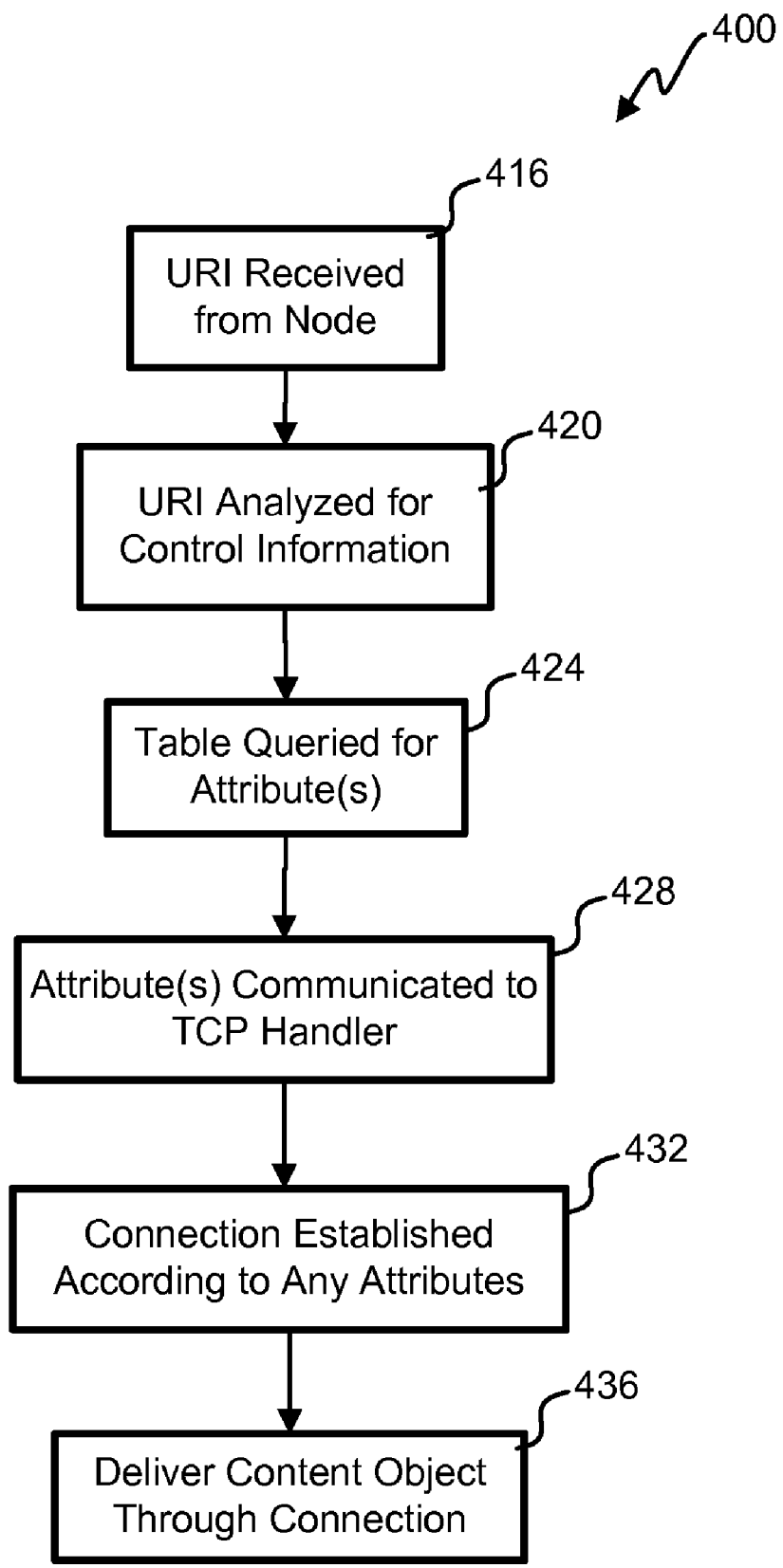
FIG. 4 illustrates a flowchart of an embodiment of a process for modifying protocol attributes potentially on a connection-by-connection basis.

Referring to FIG. 4, an embodiment of a process for potentially modifying protocol attributes on a connection-by-connection basis is shown. The depicted portion of the process begins in block 416 where a uniform resource indicator (URI) is requested by the client 102. The cache function 208 of the server 206 receives the request for the content object. The URI is evaluated by the protocol attribute selector 212 to find a match to something in the table 220. The table 220 is queried in block 424 for any attributes. Retrieved attributes are communicated to the TCP handler 214 in block 428. The connection is established in block 432 according to the selected attributes to connect the end user system 102 with the server 206. The content object is delivered in block 436. This process is performed on each URI such that each connection or socket can be independently controlled, if desired. Indeed, two different end user systems 102 could request the same content object and it could be delivered in a very different manner with different selected protocol attributes for each user.

Figure 5:
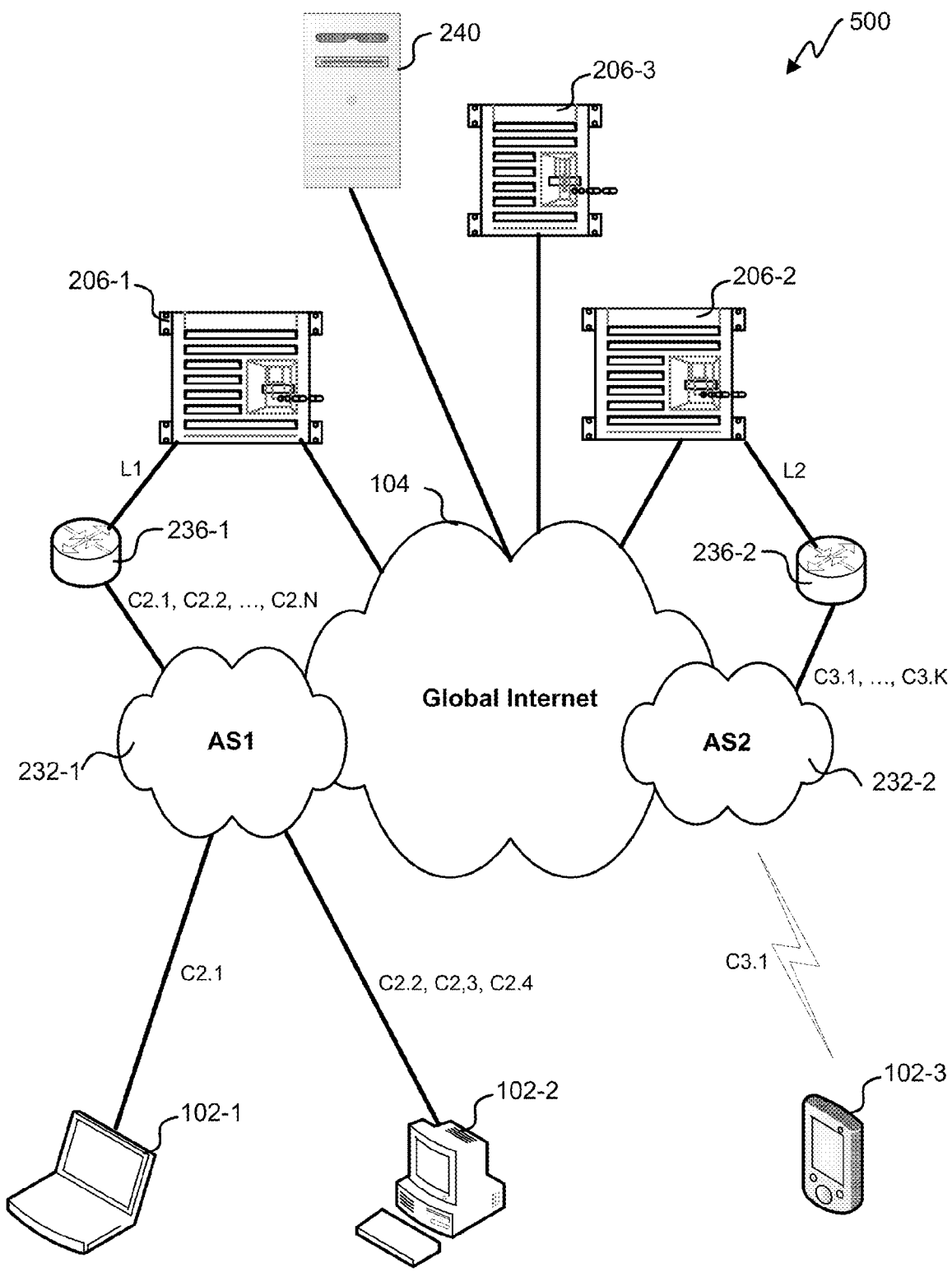
FIG. 5 shows aspects of a content delivery system.

Referring to FIG. 5, a block diagram of an embodiment of a content delivery system 500 is shown. Content delivery system 500 operates in a manner that is similar to the content delivery systems of FIGS. 1-2 and therefore the description of those systems is also applicable to the present embodiment. While continuing reference will be made to the preceding embodiments, in the interest of clarity, the discussion of common elements and functionality will not be repeated.

As illustrated, end user computers 102 access the global internet 104 through autonomous systems 232. Autonomous systems 232 may include internet service providers which offer end users access to the global internet 104 over a private communication network. Different providers may offer different types of service and may serve different geographic areas. For example, autonomous system AS1 can represent a DSL communication network such as those operated by AT&T or Qwest Communications, or it could be a cable access network such as those operated by Cox Communications in the United States, or by Rogers Communications in Canada. Autonomous system AS2 could be a satellite communication network, a cellular network, a WiMAX (IEEE 802.16) network, Wi-Fi™ (IEEE 801.11) access, and the like. Depending upon the underlying communications technology, autonomous systems 232 can present different network characteristics that are relevant to the performance of a transport layer protocol such as TCP.

Content delivery servers 206 are also connected to the global internet 104 and can be connected to corresponding autonomous systems 232. As shown, content server 206-1 is connected to autonomous system 232-1 by router 236-1 and content server 206-2 is connected to autonomous system 232-2 by router 236-2. Routers 236 thus provide direct links L1, L2 between servers 206 and their corresponding autonomous systems 232. In some embodiments, servers 206-1, 206-2 can be edge servers that are collocated with the autonomous system network infrastructure and provide large bandwidth and fast response times for content distribution to end users in a particular location. In an exemplary embodiment, each server 206 is configured to handle approximately 2000 connections per second and can support a 10 Gbps link to its corresponding autonomous system. Of course, the number of servers, number of connections, and data rates may vary based on the location served, traffic patterns, hardware capabilities, and other factors.

Servers 206 also communicate with origin server 240. Origin server 240 can act as a source of the content distributed to end users. For example, servers 206 may cache content received from origin server 240 and may use the cached content to fulfill end user requests. If requested content is not found in their respective caches, servers 206 can send a request for the missing content to origin server 240. When requesting content, servers 206 can report information about the content request as well as the conditionally adapted protocol parameters to the origin server 240. The origin server 240 can collect, compile, and distribute information to servers 206 for use in adapting connection parameters. For example, the origin server 240 can function as part of a CPIMDS and can distribute URL tables 220 and other protocol performance information to servers 206 as previously discussed.

Figure 6:
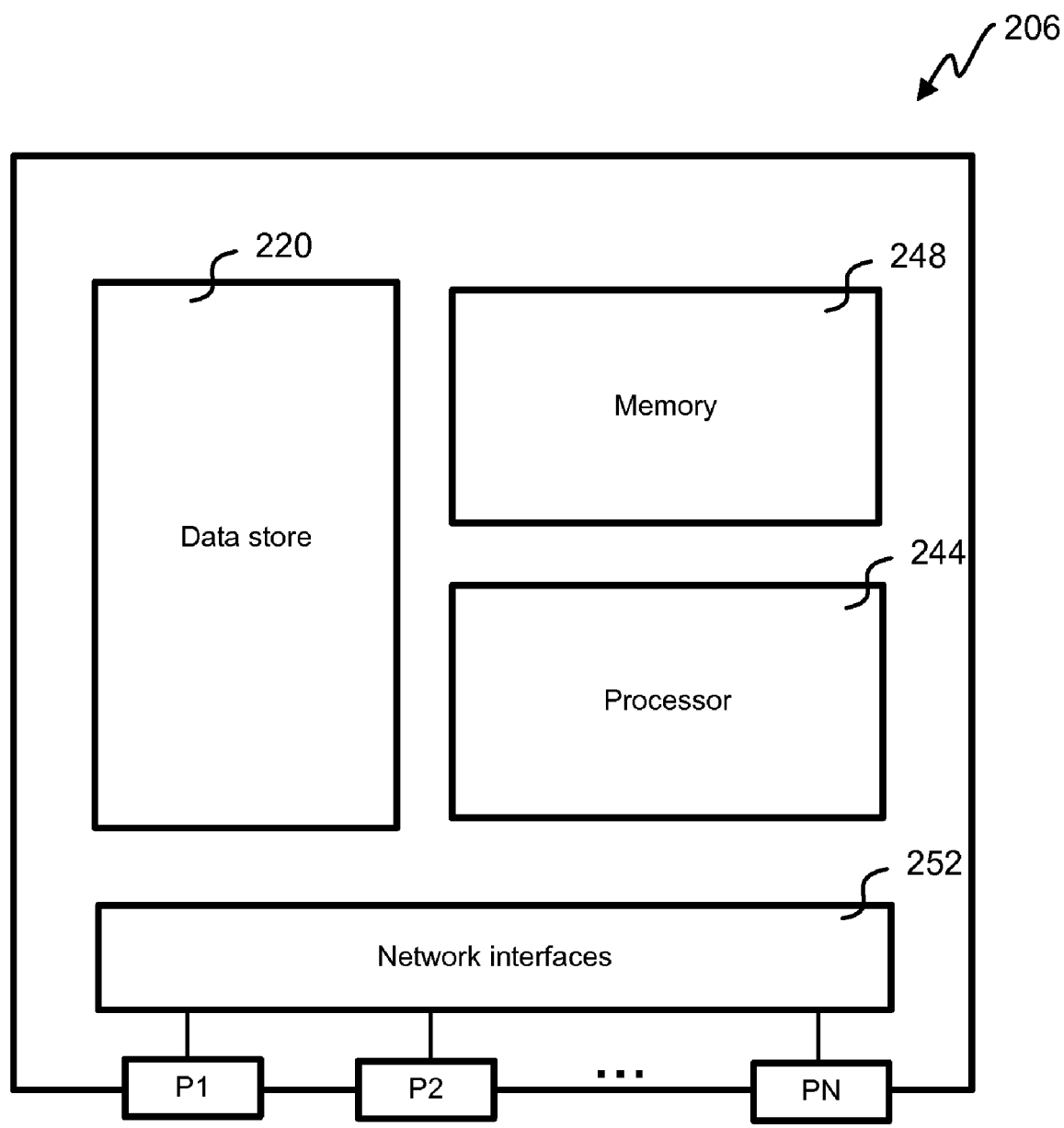
FIG. 6 is a block diagram of an embodiment of a content distribution server.

FIG. 6 is a functional block diagram of content distribution server 206 according one embodiment of the present invention. As shown, server 206 includes a processor 244, memory 248, one or more network interfaces 252, and a data store 220. Although not shown, server 206 can also include a cache function 208 and a content cache 210 as previously described.

Network interfaces 252 can include a plurality of ports (P1, . . . , PN) for sending and receiving data over a connecting network. In some embodiments, at least one network interface is dedicated to providing a high-bandwidth link to an autonomous system and can be matched to its particular network characteristics. Additional ports and/or network interfaces can provide access to the global internet 104, origin server 204, or other parts of a content delivery system.

Processor 244 executes programmable instructions for managing the delivery of content to end user computers 102 and can include one or more general purpose microprocessors or application-specific hardware elements. As shown, processor 244 is coupled to memory 248 which can include any combination of volatile or non-volatile computer-readable storage such as random access memory (RAM), read only memory (ROM), magnetic disk storage, and the like. Memory 248 can provide a data store 220 which, as previously described, can be a table or other data structure including information for modifying transport layer performance parameters. Data store 220 is discussed further in connection with FIG. 8.

Server 206 can include a number of data sources which respond to content requests from end users. In one embodiment, processor 244 supports a protocol stack that enables changes affecting the performance of the transport layer to be made from higher layers in the stack on a per-connection or per-request basis. This enables server 206 to receive a content request from an end user computer over an existing connection, gather information about the request, and intelligently modify the performance of the connection based on information from the request. In this way, for example, server 206 can modify TCP performance parameters based on known characteristics of the connecting network, the geographic location of the end user, metadata associated with the requested content, a service level of the content provider, link utilization, or any combination of these and other factors.

Figure 7:
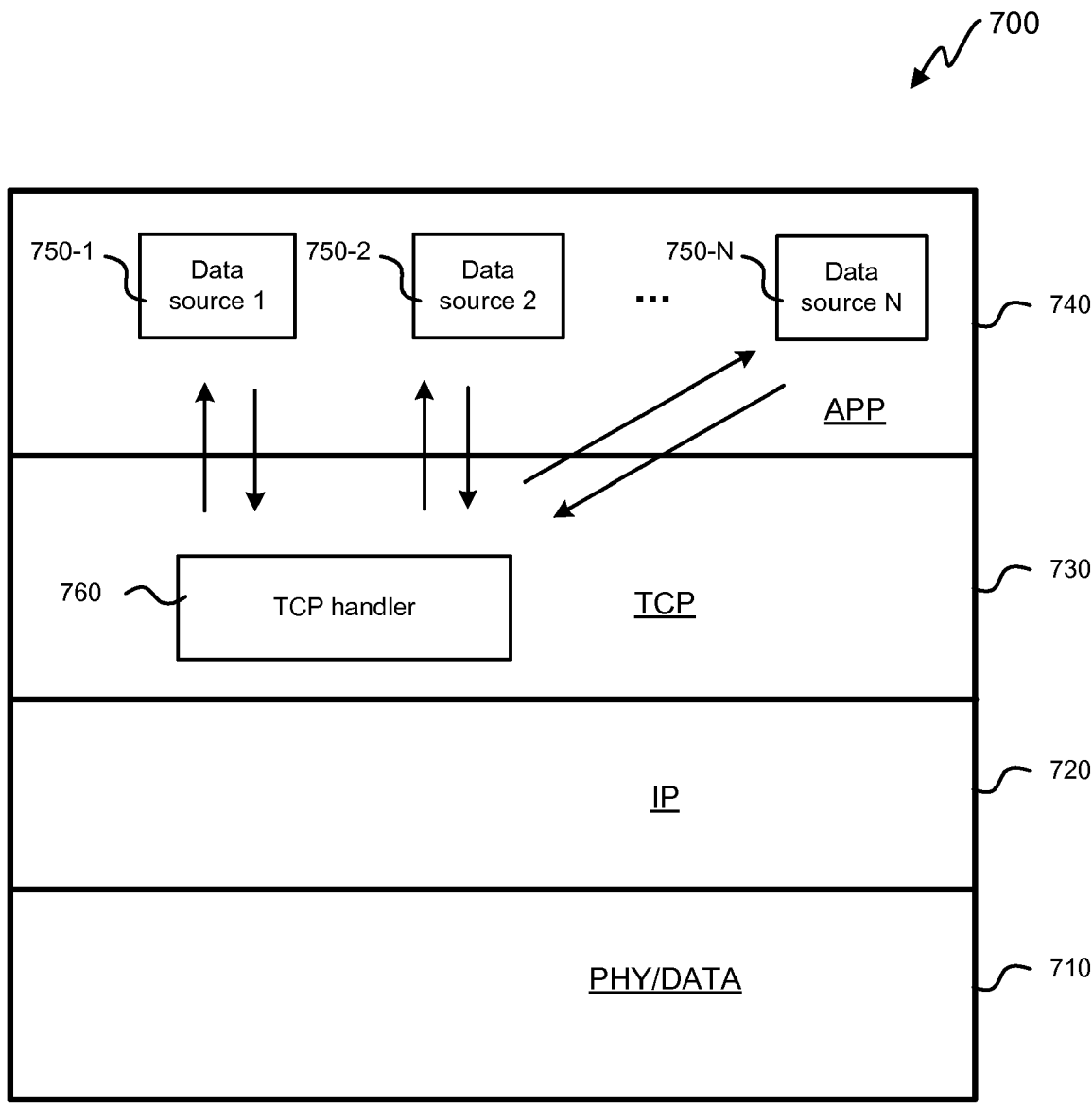
FIG. 7 shows an exemplary content distribution server protocol stack.

FIG. 7 illustrates a modified TCP protocol stack 700 such as can be included as part of content server 206 according to one embodiment of the present invention. As shown, layers 710-740 correspond roughly to layers of the standard OSI network model. At the lowest layers 710 in the protocol stack (physical and data link layers), data bits are received at the network interface hardware and assembled into data units for delivery to the next higher layer. Here, a network layer 720 includes an IP module that receives IP packets from the lower layers and determines an appropriate transport layer protocol based on their header information. With transport control protocol, network layer 720 sends TCP messages to the transport layer 730 which, in turn, passes application messages to data sources 750 in the application layer 740.

In operation, an end user computer 102 can establish a TCP connection with content server 206. The connection can be created using a collection of TCP parameters which are preconfigured at the server and do not necessarily reflect information about the end user or the way in which the end user computer is connected to the server. For example, referring again to FIG. 5, computer 102-1 can initiate a connection C2.1 with server 206-1 to start a TCP session. Once the connection is established, the end user can send a content request over the connection. As illustrated, a single end user computer 102 can establish multiple connections to a given server 206 and each connection can carry multiple content requests. Protocol stack 700 is configured such that TCP settings can be adjusted on a per-connection or even a per-request basis.

When a content request is received at server 206, it is conveyed through protocol stack 700 to an appropriate data source 750 in the application layer 740. For example, a web server 750-1 can respond to requests for web pages, a caching application 750-2 can respond to file requests, and an application server 750-N can respond to requests for application services. Server 206 can include any number or arrangement of data sources 750 and each data source can respond to multiple content requests.

Each data source 750 can interact with a TCP handler 760 at the transport layer 730 to modify its connections. In one embodiment, TCP handler 760 enables the data sources to modify the timing at which packets are sent to the end user computer to be more or less aggressive based on information gathered from the content request. TCP handler 760 can also modify the pace at which packets are sent. Pacing can indicate that a burst of packets should be sent as soon as possible or that data transmission should be spread out over time. The maximum TCP send window ("send buffer size") for a connection can also be adjusted. For example, in some embodiments, TCP handler 760 can adjust the maximum send buffer to be a multiple of a standard size and can permit buffer utilization to increase until it reaches the maximum size. Alternatively, TCP handler 760 can vary the number of bytes allocated for a particular connection directly.

Generally speaking, each content request has at least two pieces of information. These include a source address of the end user computer and an identifier corresponding to the requested content. For example, a data source 750 that responds to the request for sample URL, http://customer1.webserving.com/folderB/directory/logo.gif, would know the IP address of the requesting computer (e.g., abc.def.ghi) as well as the file name of the requested content (logo.gif). From this starting point, server 206 can obtain additional information from data store 220 with which to modify the transport layer parameters of the TCP connection.

Figure 8C:
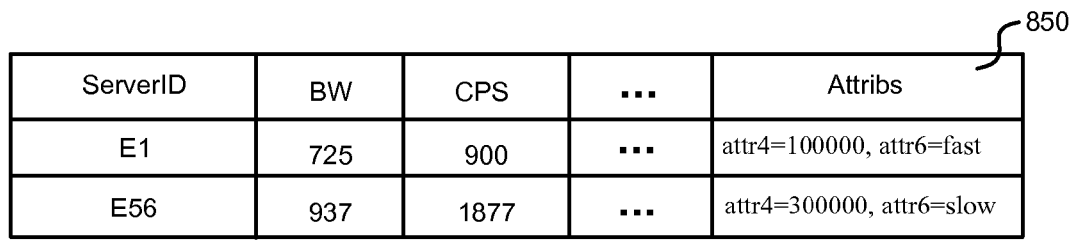

FIGS. 8A-8C illustrate partial exemplary data elements 810-850 such as can be maintained in data store 220 and used for determining modified parameters for a TCP connection.

FIG. 8A illustrates exemplary data corresponding to a requested content object. In particular, table 810 can represent a collection of metadata 810. Metadata for each requested object can include a file name, file size, file type, and content provider as well as TCP attributes associated with the content object. For example, attr1 can represent pacing on the TCP connection. In some embodiments, pacing is disabled for small files and enabled for large files. This can permit content requests involving a large number of small files to be fulfilled with quick bursts and can facilitate a more even delivery of large content. TCP attributes can also correspond to the type of data such as whether the requested content is text or video information.

Table 820 includes information about content providers. Each content object can be associated with a content provider. The associated content provider can be identified in the file metadata or it can be determined from the URL of the content request. In some cases, content providers can select a service level for the distribution of their content on the content delivery system. Among other possibilities, requests for content from providers that choose a premium service level can be biased in favor of increased performance. For example, requests for provider ABC's content can be preferentially modified (e.g., attr6=fast) and, when appropriate, can be allocated a relatively larger send buffer (e.g., attr4=300,000). By contrast, requests for provider DEF's content at the standard service level can be assigned a smaller send buffer (attr4=100, 000) and modified only on a best efforts basis (attr6=slow). Service level can also set on a per-request basis. For example, a customer can elect a high level of service by adding information to the request query string.

FIG. 8B illustrates exemplary data corresponding to the network address of an end user computer. Table 830 provides an association between IP address, geographic location, and autonomous system number. A source IP address can be obtained from TCP header information and used to identify a geographic region of the end user computer. The geographic region can be a city, state, country, or continent and can provide a rough estimate of the distance or round trip time from the server 206 to the end user computer. In addition, geographic location can also be a rough indicator of service. For example, network communications in Asia may be characterized by a higher latency than network connections in Europe or some other location. These differences can be factored into the TCP attributes so that, for example, more aggressive timing parameters can be used with Asia-based IP addresses.

Table 830 can also store information about primary routes to particular locations. For example, a considerable amount of network traffic destined for South America passes through servers in Florida and other primary gateway locations. The attributes in table 830 can be biased to optimize TCP performance based on conditions at these gateway servers. For example, TCP timing parameters may be adjusted based on traffic statistics and load along a primary route such that transmit timing for South American connections is made more or less aggressive. Many other location-specific adjustments are possible within the scope of the present invention. In some embodiments, cost and path information can also be included. As an example, transit charges and other direct costs of providing service can be tracked as well as indirect or resource costs.

Table 840 provides information about the autonomous systems. Server 206 can determine an autonomous system (AS) number for an end user computer based on the source address of a content request. The AS number, in turn, can be used to obtain additional information for modifying TCP parameters. For example, if it is known that a particular AS is associated with a type of network, the characteristics of the network technology can be used to determine appropriate TCP parameters for a connection. Cable networks can have a relatively high bandwidth and may be less prone to saturation than DSL networks. Satellite connections, on the other hand, are typically associated with high latency. Server 206 can take advantage of these characteristics by matching timing and pacing parameters to the particular type of network.

When server 206 is collocated at an AS data center, link statistics can be maintained and used to determine TCP parameters. As a link nears full capacity, for example, it may be inappropriate to increase the timing or send buffer size of connections. In some embodiments, the preconfigured TCP parameters are used when link utilization exceeds a predetermined threshold. Thus, among other possibilities, the attributes associated with AS information can indicate whether or not TCP parameters should be modified and, if modification is appropriate, which parameters are best suited for known characteristics of the AS network.

FIG. 8C illustrates exemplary data corresponding to server utilization. In some embodiments, each content distribution server 206 has a limited amount of bandwidth and is intended to support a certain network load. As the server approaches its limits, it may be appropriate to scale back on resource allocation to TCP connections. Conversely, when the server experiences a light load, it may be appropriate to allocate more system resources to improving the performance of TCP connections. Table 850 provides information for judging load at a content distribution server, including a bandwidth allocation (BW) measures and a connection rate (CPS).

By way of illustration, assume that a particular server 206 can support up to 2,000 connections per second and has available bandwidth of 1 Gbps. When connection rates and bandwidth usage are low, more resources are available for modifying connections. In that case, it may be appropriate to use more aggressive timing, larger buffers and other performance enhancements. Thus, for example, connections to server E1 may be modified by increasing the maximum send buffer size to 300,000 bytes and biasing towards aggressive timing and/or pacing utilization. On the other hand, server E56 is nearing full capacity and may therefore bias new connections to the preconfigured TCP parameters.

As will be readily appreciated, many different combinations of factors can affect when and how a TCP connection is modified. Different weights and precedence can be assigned to the different types of information available from the data store 220. For example, system resources may have the highest precedence, followed by service level, and then by metadata and AS factors, and finally by geographic considerations. Across categories, different weights may be assigned to the attributes so that a data source 750 can determine modified TCP parameters based on the net effect of some or all of the available information.

Figure 9:
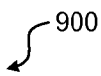
FIG. 9 shows exemplary performance profiles such as can be used with a content distribution server.

FIG. 9 shows exemplary performance profiles 900 such as can be utilized to modify TCP parameters according to embodiments of the present invention. Rather than determining parameters by combining individual factors, server 106 can include predetermined profiles for content requests. In the example, profile P1 provides TCP settings for sending large files to nearby (low-latency) users. As illustrated, a performance increase can be realized by pacing such connections and allowing the TCP send buffer to grow very large. Relatively less aggressive timing adjustments are needed due to the low latency factor. Profile P2, on the other hand, represents large file transfers to a latent user. In that case, pacing is still used with the transfer, but more aggressive transmit timing may help to compensate for latency and an intermediate send buffer may be appropriate. Profile P3 can be used to transfer small files. With small files, it may be desirable to disable pacing and transmit files in bursts. As a result, a large send buffer may not be needed.

Figure 10:
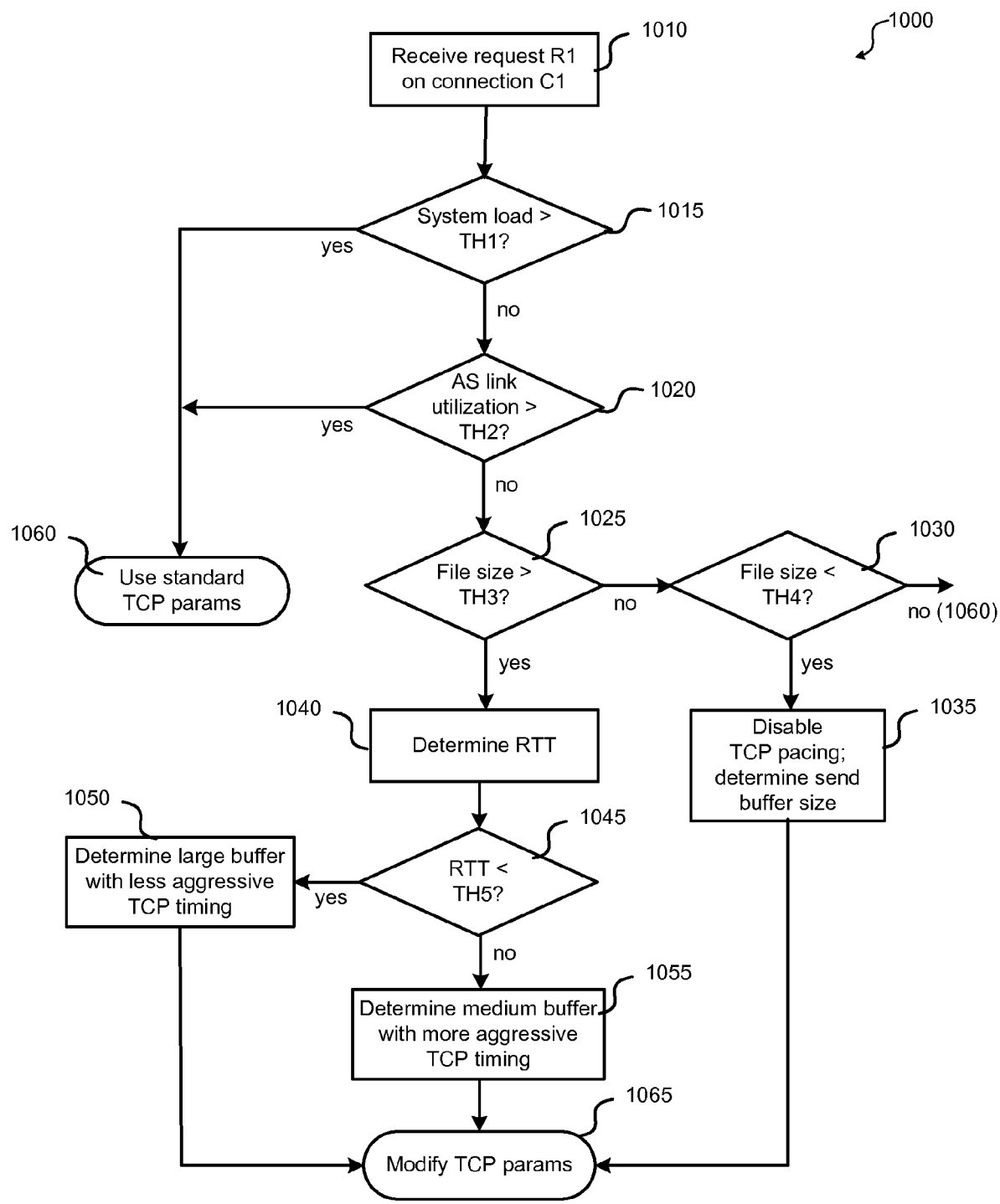
FIG. 10 is a flowchart of a process for modifying transport layer protocol attributes.

FIG. 10 shows an embodiment of a process 1000 for modifying protocol attributes on a connection-by-connection or request-by-request basis. Process 1000 can be performed by a data source 750 or by the caching function 208 of a content distribution server 206. At block 1010, a content request R1 is received over an existing connection C1 at the server. The request can include the URI of a content object. The content object may be available in content cache 210, or from origin server 240, or from some other server accessible through the content delivery system.

The content request R1 can be conveyed through the lower layers of protocol stack 700 to the appropriate data source 750 in the application layer 740. Since server 206 is capable of modifying transport layer parameters on a connection-by-connection and even a request-by-request basis, the present process can be repeated for each new request (e.g., R2/C1) and/or each new connection (e.g., R1/C2) as determined by the data source 750 or caching function. Note also that that server 206 need not be dedicated to serving a particular type of content but can deliver files, images, video, or any other content available through the content delivery system.

After the request for content is received, the responding data source 750 determines whether the transport layer parameters used with the connection and/or request should be modified. Modifying the transport layer parameters is completely transparent to the end user; the end user is not required to install software or monitoring applications to receive a performance benefit.

At block 1015, the server 206 makes an initial determination as to whether system load exceeds a predetermined threshold TH1. For example, the responding data source 750 can query the information in table 850 to determine current bandwidth usage and system load. If the system is experiencing a heavy load, pre-configured TCP parameters may be used. In that case, the process ends at block 1060. On the other hand, if system load is below threshold TH1, a further determination is made as to link utilization. This can involve, for example, accessing the information in table 840. If link utilization exceeds a predetermined threshold TH2, then the process can terminate at block 1060 and preconfigured TCP parameters can be used with the connection/request.

When there is sufficient system resources and link capacity, a determination can be made regarding the TCP parameters based on file size. The size of a requested file can be determined by accessing the metadata of table 810. At block 1025, the file size is compared to a threshold value TH3 to determine if it is a "large" file. If the file is not a large file, then at block 1030 it is compared to another threshold TH4 to determine if it is a "small" file. If the requested file does not fit in either category, then the preconfigured TCP settings may be used. Otherwise, for small files, pacing can be disabled and an appropriate send buffer size can be determined at block 1035. Thereafter, at block 1065, the responding data source or cache application directs the TCP handler to modify the connection for the small-file transfer.

With large files, it can be useful to make a further determination as to latency. At block 1045, a round trip time (RTT) from the server to the end user computer is determined. This can be done by sending ICMP messages to the end user's address and measuring the response time. If RTT is less than a predetermined threshold TH5, then the connection may be characterized as low-latency. In that case, a relatively large send buffer size and less aggressive TCP timing may be appropriate. At block 1050, these settings are determined by the data source or cache application either based on information from individual items in data store 220 or by selecting a performance profile. On the other hand, if RTT exceeds the threshold, the connection may be characterized as high-latency. At block 1055, parameters for the large-file, high-latency transfer are determined. At block 1065, the data source or cache function modifies the connection through the TCP handler for the large file transfer.

Figure 11:
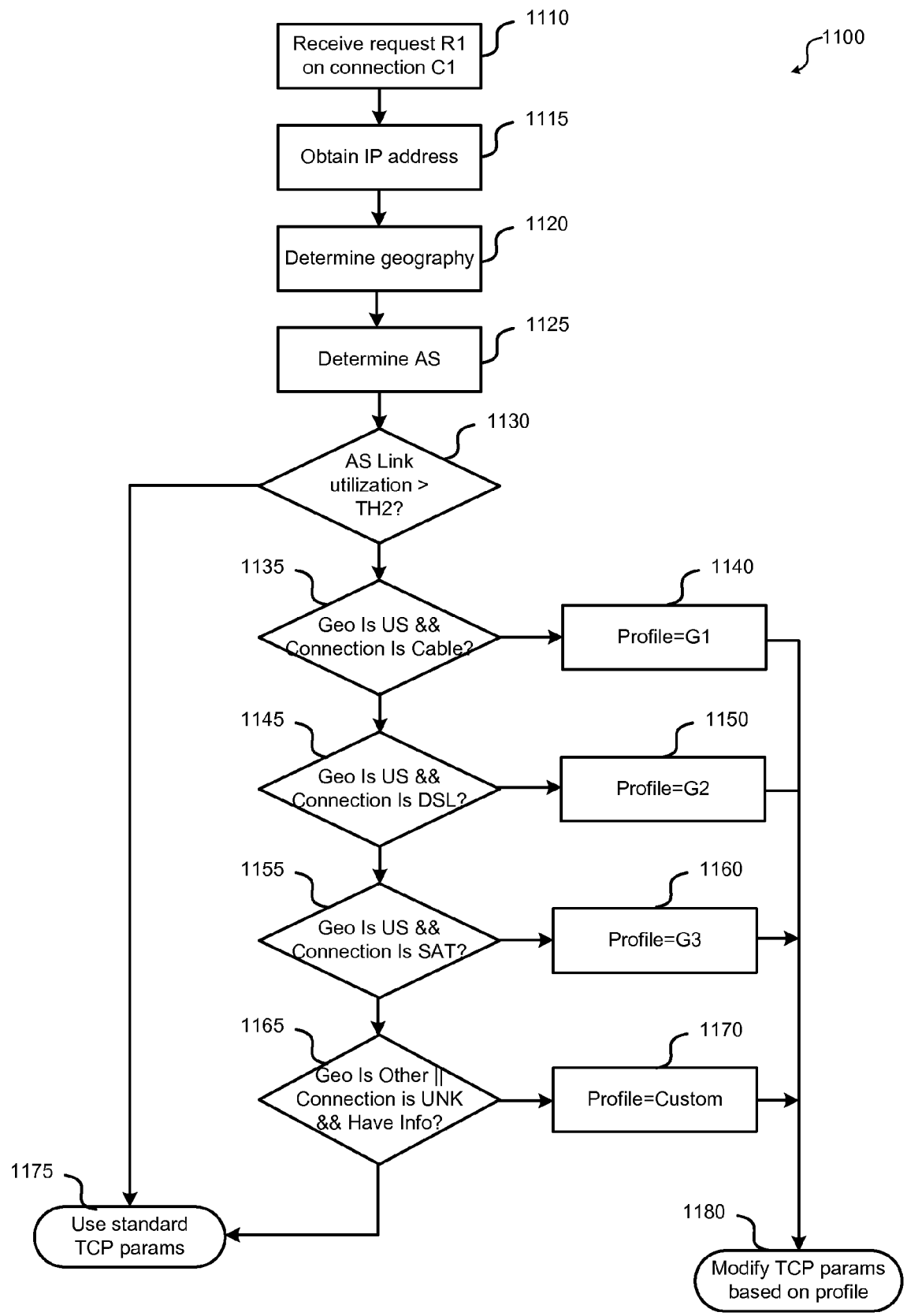
FIG. 11 is a flowchart of process for modifying transport layer protocol attributes.

FIG. 11 shows an additional embodiment of a process 1100 for modifying protocol attributes. Process 1100 can be performed by a data source 750 or by the caching function of content distribution server 206. The process begins at block 1110 when a request R1 is received from an end user computer over connection C1. As previously noted, the process can be repeated for each new request (e.g., R2/C1) and/or each new connection (e.g., R1/C2) as determined by the data source 750 or caching function.

At block 1115, the IP address of the client is determined and the data source or cache function begins to gather information for modifying the connection. Initially, a geographic location and autonomous system of the end user computer are determined based on the IP address (blocks 1120-1125). If the server has a dedicated link to the AS, link utilization is determined at block 1130 and compared to a predetermined threshold TH2. When the link capacity is below the threshold, the process terminates and the standard or pre-configured TCP parameters are used for the connection/request. If link utilization does not apply to the connection, or if link utilization is below threshold TH2, the process continues.

In this embodiment, a predetermined profile is selected based on the geographic location of the client and the type of connection. For locations in the United States served by cable access networks, blocks 1135-1140, a first geographic performance profile G1 can be used. Relatively low latency may be assumed for US locations and this profile can adjust TCP timing to take advantage of the relatively high burst capability of cable networks. For locations in the United States served by digital subscriber line (DSL) networks, blocks 1145-1150, a second geographic performance profile G2 can be used. This profile may use slightly less aggressive timing with a relatively large send buffer. Finally, for US locations served by satellite networks, blocks 1155-1160, a third geographic profile G3 can be used. This profile may assume high latency but reliable delivery and therefore use relatively more aggressive TCP timing and an intermediate send buffer size.

Customized profiles can be used for non-US locations or when autonomous system information is not available as shown by blocks 1165-1170. For example, a China-specific profile or an Asia-specific profile can be developed based on historical network performance measures. Similarly, where a primary route to a particular destination is known, profiles may be developed that are customized for the appropriate connecting network elements. When the appropriate geographic performance profile has been selected, the data store or cache function modifies the connection accordingly.

Throughout this document, the terms content delivery and content download are used and can mean either file download or streaming delivery. Additionally, a content object can be either a file or a stream. For example, the content object could be a voice call stream, a video stream, an image file, a music file, a live concert, an animation, an advertisement, a web page, a slide show, data file, hosted software, transactions, executable software or the like. Content can be static or dynamic, can pre-exist on the server, can be created on the server, or can be created or obtained elsewhere in response to a request from a client.

A number of variations and modifications of the disclosed embodiments can also be used. For example, some of the above embodiments discuss use of the TCP protocol or a transport-layer protocol. Other protocols could be modified on a connection-by-connection or request-by-request basis in other embodiments. Also, connection parameters can be modified based on additional information gathered from or associated with content requests such as HTTP request headers (e.g., content-length, cookies, content-type, user agent, etc.), transport layer security (e.g., HTTPS), layer 2 addressing (e.g., the MAC address of the router from which the request was received), port number, IP properties (e.g., TOS—terms of service), hostname, and whether or not a request successfully passed through a rewrite process.

While the principles of the disclosure have been described above in connection with specific apparatuses and methods, it is to be clearly understood that this description is made only by way of example and not as limitation on the scope of the disclosure.

What is claimed is:

1. A network connection method for delivering content, the network connection method comprising:
   receiving a first request for content from a network at a server;
   analyzing the first request for content to determine first attributes, wherein analyzing the first request comprises comparing a first uniform resource indicator (URI) with an alphanumeric string to correlate the first URI with the first attributes;
   configuring a first connection for serving the content between the server and a first node;
   configuring a protocol of the first connection according to the first attributes, wherein the protocol that is configured is a transport layer protocol;
   receiving a second request for content from the network at the server;
   analyzing the second request for content to determine second attributes;
   configuring a second connection for serving the content between the server and a second node; and
   configuring the protocol of the second connection according to the second attributes, wherein the first attributes affect operation of the protocol differently than the second attributes affect operation of the protocol.

2. The network connection method for delivering content as recited in claim 1, wherein the protocol is transmission control protocol (TCP).

3. The network connection method for delivering content as recited in claim 1, wherein the processes of analyzing the first request and analyzing the second request are both performed away from the server.

4. The network connection method for delivering content as recited in claim 1, wherein the first connection and second connection serve the content at least partially coextensive in time.

5. The network connection method for delivering content as recited in claim 1, wherein the content in the first-listed analyzing limitation is different from the content in the second-listed analyzing limitation.

6. A system for managing delivery of content over a network, the system comprising:
   protocol handler managing a first connection and a second connection over the network using a protocol, wherein:
      the protocol operates at an transport layer,
      the protocol handler is configured to use first attributes for the first connection, and
      the protocol handler is configured to use second attributes for the second connection;
   a store holding a plurality of attributes; and
   a protocol attribute selector, configured to:
      receive first information relating to a first request for content wherein the first information is derived from a first uniform resource indicator (URI) associated with the first request for content,
      query the store for first attributes corresponding to the first information,
      program the protocol handler with the first attributes for the first connection,
      receive second information relating to a second request for content,
      query the store for second attributes corresponding to the second information, and
   program the protocol handler with the second attributes for the second connection.

7. The system for managing delivery of content over the network as recited in claim 6, wherein the protocol is transmission control protocol (TCP).

8. The system for managing delivery of content over the network as recited in claim 6, further comprising a protocol stack that sends the content to a first node using the first connection and a second node using the second connection.

9. The system for managing delivery of content over the network as recited in claim 6, wherein:
   the protocol handler is part of a server, and
      at least one of the store and the protocol attribute selector is located away from the server.

10. The system for managing delivery of content over the network as recited in claim 6, wherein the first connection and second connection serve the content at least partially coextensive in time.

11. The system for managing delivery of content over the network as recited in claim 6, wherein the content of the first connection is different from the content in the second connection.

* * * * *